(12) United States Patent
Song et al.

(10) Patent No.: US 12,694,161 B2
(45) Date of Patent: Jul. 28, 2026

(54) OPERATING METHOD OF STORAGE DEVICE AND OPERATING METHOD OF STORAGE SYSTEM INCLUDING STORAGE DEVICE

(71) Applicant: Samsung Electronics Co., Ltd., Suwon-si (KR)

(72) Inventors: Yonghwan Song, Suwon-si (KR); Jisoo Kim, Suwon-si (KR); Jimin Ryu, Suwon-si (KR); Younsung Chu, Suwon-si (KR); Jaegyu Lee, Suwon-si (KR); Daejin Jung, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 205 days.

(21) Appl. No.: 18/502,321

(22) Filed: Nov. 6, 2023

(65) Prior Publication Data

US 2024/0160794 A1     May 16, 2024

(30) Foreign Application Priority Data

Nov. 10, 2022   (KR) ........................ 10-2022-0149352
Mar. 2, 2023   (KR) ........................ 10-2023-0027964

(51) Int. Cl.
G06F 21/00      (2013.01)
G06F 21/60      (2013.01)
G06F 21/64      (2013.01)
G06F 21/79      (2013.01)

(52) U.S. Cl.
CPC ............ G06F 21/79 (2013.01); G06F 21/602 (2013.01); G06F 21/64 (2013.01)

(58) Field of Classification Search
None
See application file for complete search history.

(56) References Cited

U.S. PATENT DOCUMENTS 7,167,943 B2 *   1/2007   Tashiro ................ G06Q 20/341
                                                   365/189.011
7,679,133 B2   3/2010   Son et al.
8,553,466 B2   10/2013   Han et al.
(Continued)

OTHER PUBLICATIONS

Extended European Search Report dated Mar. 22, 2024 for corresponding European Application No. 23208986.2.

Primary Examiner — Andrew J Steinle
(74) Attorney, Agent, or Firm — Harness, Dickey & Pierce, P.L.C.

(57)      ABSTRACT

Provided are an operating method of a storage device and an operating method of a storage system including the storage device. An operating method of a storage device including a nonvolatile memory device and a storage controller includes storing, by the storage controller, a public key received from a first host, transmitting, by the storage controller, a random number to a second host in response to a host authentication start request from the second host that has obtained the public key and a private key corresponding to the public key, receiving, by the storage controller, a signature generated based on the private key and the random number from the second host, verifying, by the storage controller, the signature based on the public key, and changing, by the storage controller, a first device parameter according to a request from the second host in response to the signature being verified.

18 Claims, 23 Drawing Sheets

(56)  References Cited

U.S. PATENT DOCUMENTS

| | | | |
|---|---|---|---|
| 8,559,235 B2 | 10/2013 | Yoon et al. | |
| 8,654,587 B2 | 2/2014 | Yoon et al. | |
| 9,659,191 B2 | 5/2017 | Cope | |
| 11,030,316 B2 | 6/2021 | Olarig et al. | |
| 11,126,453 B2 | 9/2021 | Keeth et al. | |
| 11,256,427 B2 | 2/2022 | Murphy et al. | |
| 2011/0233648 A1 | 9/2011 | Seol et al. | |
| 2014/0245427 A1* | 8/2014 | Nagai | G06F 21/44 |
| | | | 726/16 |
| 2017/0288867 A1* | 10/2017 | Collier | G06F 21/602 |
| 2021/0243035 A1 | 8/2021 | Ruane et al. | |
| 2022/0019356 A1* | 1/2022 | Hong | G06F 3/0637 |
| 2022/0155976 A1 | 5/2022 | Jang | |

* cited by examiner

FIG. 2

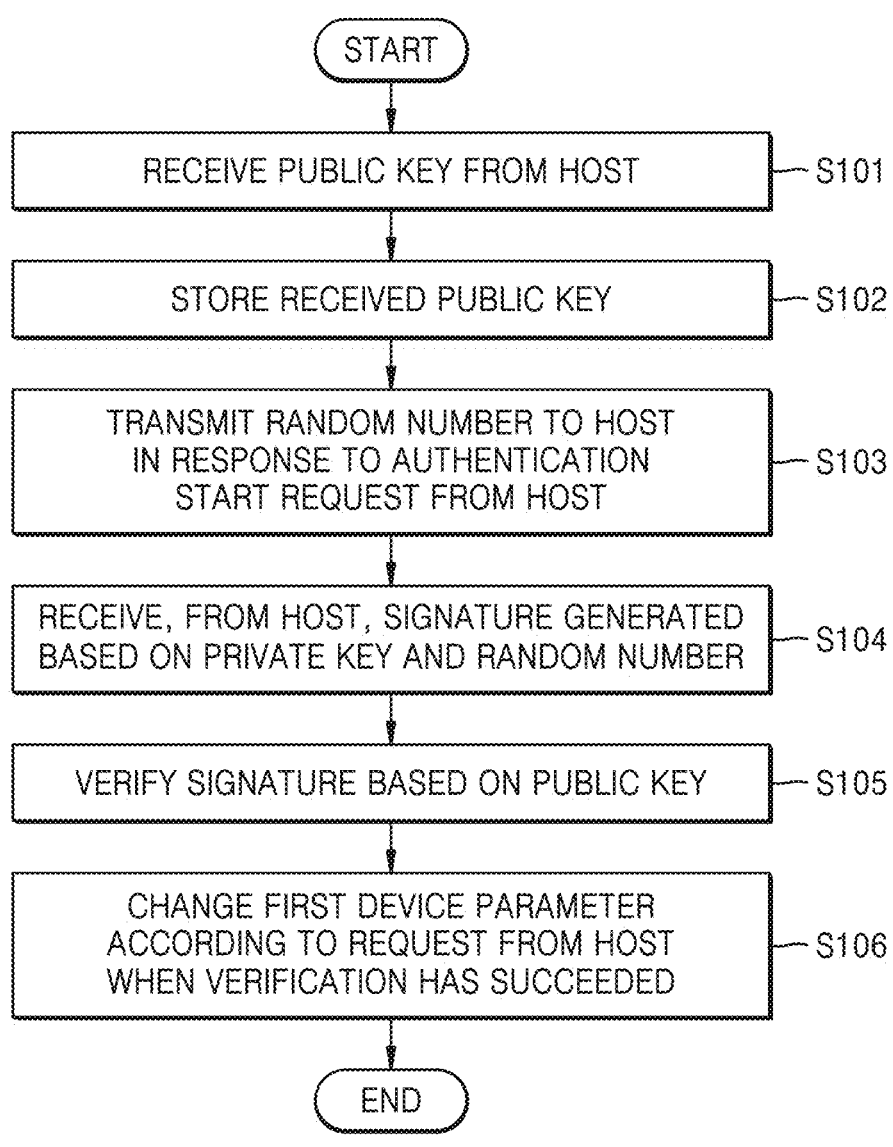

START

RECEIVE PUBLIC KEY FROM HOST — S101

STORE RECEIVED PUBLIC KEY — S102

TRANSMIT RANDOM NUMBER TO HOST
IN RESPONSE TO AUTHENTICATION
START REQUEST FROM HOST — S103

RECEIVE, FROM HOST, SIGNATURE GENERATED
BASED ON PRIVATE KEY AND RANDOM NUMBER — S104

VERIFY SIGNATURE BASED ON PUBLIC KEY — S105

CHANGE FIRST DEVICE PARAMETER
ACCORDING TO REQUEST FROM HOST
WHEN VERIFICATION HAS SUCCEEDED — S106

END

CDB for SET PUBLIC KEY COMMAND

CDB1

| Byte \ Bit | 7 | 6 | 5 | 4 | 3 | 2 | 1 | 0 |
|---|---|---|---|---|---|---|---|---|
| 0 | OPERATION CODE (B5h) | | | | | | | |
| 1 | SECURITY PROTOCOL (ECh) | | | | | | | |
| 2 | SECURITY PROTOCOL SPECIFIC (01h) | | | | | | | |
| 3 | SECURITY PROTOCOL SPECIFIC (10h) | | | | | | | |
| 4 | INC_512 = 0b | Reserved | | | | | | |
| 5 | Reserved | | | | | | | |
| 6 | TRANSFER LENGTH | | | | | | | |
| 9 | | | | | | | | |
| 10 | Reserved | | | | | | | |
| 11 | CONTROL = 00h | | | | | | | |

Data for SET PUBLIC KEY COMMAND

| Byte \ Bit | 7 | 6 | 5 | 4 | 3 | 2 | 1 | 0 |
|---|---|---|---|---|---|---|---|---|
| 0 | Tag | | | | | | | |
| 1 | Length | | | | | | | |
| 2 | Length | | | | | | | |
| 3 | Value (Public Key) | | | | | | | |
| ... | ... | | | | | | | |

FIG. 8A

CDB for CHALLENGE COMMAND

CDB2

| Byte \ Bit | 7 | 6 | 5 | 4 | 3 | 2 | 1 | 0 |
|---|---|---|---|---|---|---|---|---|
| 0 | OPERATION CODE (A2h) | | | | | | | |
| 1 | SECURITY PROTOCOL (ECh) | | | | | | | |
| 2 | SECURITY PROTOCOL SPECIFIC (02h) | | | | | | | |
| 3 | SECURITY PROTOCOL SPECIFIC (10h) | | | | | | | |
| 4 | INC_512 = 0b | Reserved | | | | | | |
| 5 | Reserved | | | | | | | |
| 6 | TRANSFER LENGTH | | | | | | | |
| 9 | | | | | | | | |
| 10 | Reserved | | | | | | | |
| 11 | CONTROL = 00h | | | | | | | |

Data for CHALLENGE COMMAND

| Byte \ Bit | 7 | 6 | 5 | 4 | 3 | 2 | 1 | 0 |
|---|---|---|---|---|---|---|---|---|
| 0 | Challenge(Random Number) [0] | | | | | | | |
| 1 | Challenge(Random Number) [1] | | | | | | | |
| ... | ... | | | | | | | |
| 30 | Challenge(Random Number) [30] | | | | | | | |
| 31 | Challenge(Random Number) [31] | | | | | | | |

FIG. 9A

CDB for AUTHENTICATION COMMAND

CDB3

| Bit<br>Byte | 7 | 6 | 5 | 4 | 3 | 2 | 1 | 0 |
|---|---|---|---|---|---|---|---|---|
| 0 | OPERATION CODE (B5h) | | | | | | | |
| 1 | SECURITY PROTOCOL (ECh) | | | | | | | |
| 2 | SECURITY PROTOCOL SPECIFIC (03h) | | | | | | | |
| 3 | SECURITY PROTOCOL SPECIFIC (10h) | | | | | | | |
| 4 | INC_512<br>= 0b | Reserved | | | | | | |
| 5 | Reserved | | | | | | | |
| 6 | TRANSFER LENGTH | | | | | | | |
| 9 | | | | | | | | |
| 10 | Reserved | | | | | | | |
| 11 | CONTROL = 00h | | | | | | | |

Data for AUTHENTICATION COMMAND

| Bit<br>Byte | 7 | 6 | 5 | 4 | 3 | 2 | 1 | 0 |
|---|---|---|---|---|---|---|---|---|
| 0 | Hash Algorithm | | | | | | | |
| 1 | Length | | | | | | | |
| 2 | Length | | | | | | | |
| 3 | Value (Signature) | | | | | | | |
| 4 | ... | | | | | | | |

FIG. 11A

CDB4

CDB for RESET ALL KEY

| Bit<br>Byte | 7 | 6 | 5 | 4 | 3 | 2 | 1 | 0 |
|---|---|---|---|---|---|---|---|---|
| 0 | OPERATION CODE (B5h) | | | | | | | |
| 1 | SECURITY PROTOCOL (ECh) | | | | | | | |
| 2 | SECURITY PROTOCOL SPECIFIC (04h) | | | | | | | |
| 3 | SECURITY PROTOCOL SPECIFIC (10h) | | | | | | | |
| 4 | INC_512<br>= 0b | Reserved | | | | | | |
| 5 | Reserved | | | | | | | |
| 6 | TRANSFER LENGTH | | | | | | | |
| 9 | | | | | | | | |
| 10 | Reserved | | | | | | | |
| 11 | CONTROL = 00h | | | | | | | |

Data for RESET ALL KEY

| Bit<br>Byte | 7 | 6 | 5 | 4 | 3 | 2 | 1 | 0 |
|---|---|---|---|---|---|---|---|---|
| 0 | Hash Algorithm | | | | | | | |
| 1 | Length | | | | | | | |
| 2 | Length | | | | | | | |
| 3 | Value | | | | | | | |
| 4 | ... | | | | | | | |

Figure 16:
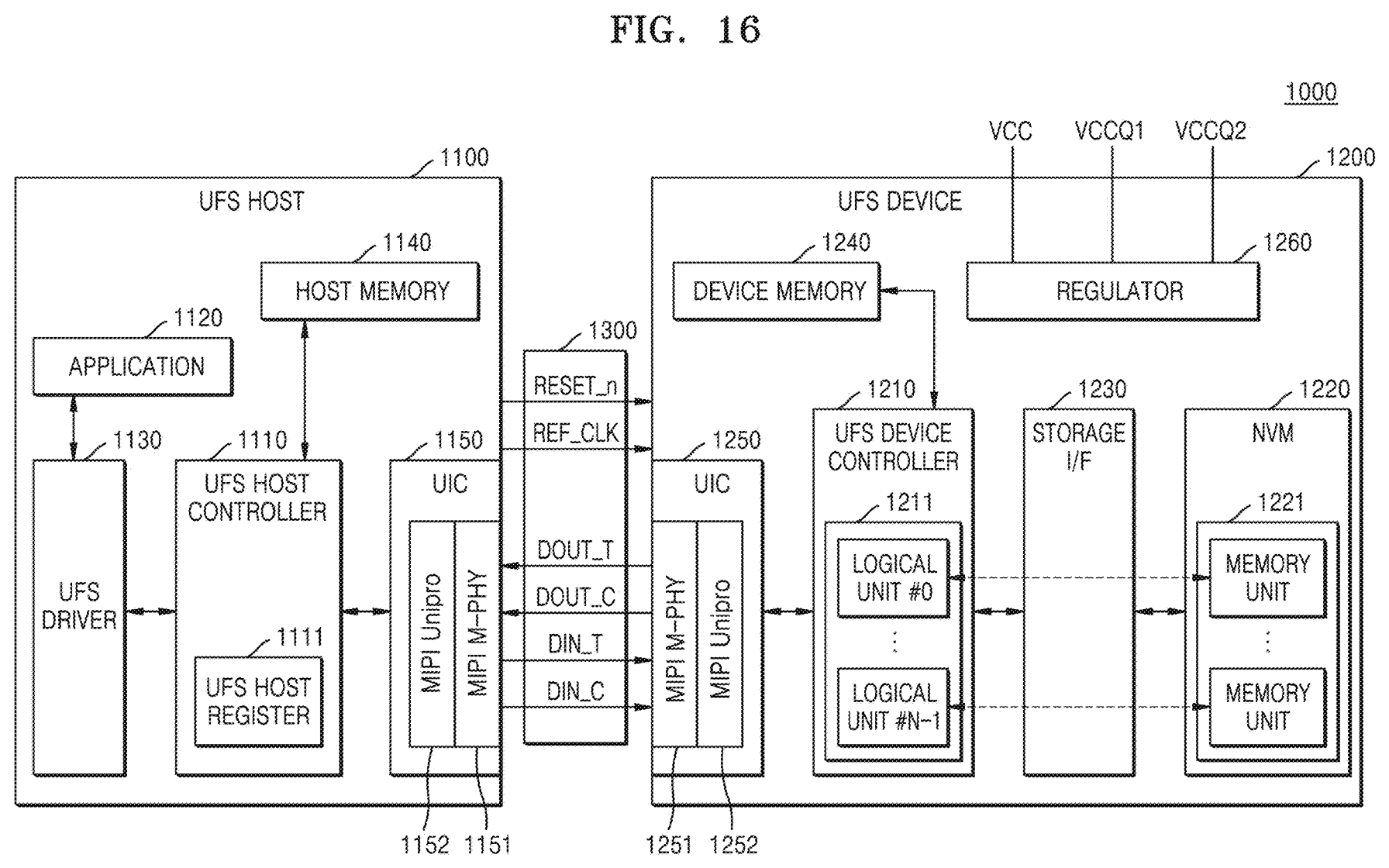

UFS DEVICE

1260 REGULATOR — VCC VCCQ1 VCCQ2

1240 DEVICE MEMORY

1220 NVM
1221 MEMORY UNIT ... MEMORY UNIT

1230 STORAGE I/F

1210 UFS DEVICE CONTROLLER
1211 LOGICAL UNIT #0 ... LOGICAL UNIT #N-1

1250 UIC
1251 MIPI M-PHY
1252 MIPI Unipro

1300
RESET_n
REF_CLK
DOUT_T
DOUT_C
DIN_T
DIN_C

1100

UFS HOST

1140 HOST MEMORY

1120 APPLICATION

1130

1110 UFS HOST CONTROLLER
1111 UFS HOST REGISTER

UFS DRIVER

1150 UIC
1151 MIPI M-PHY
1152 MIPI Unipro

OPERATING METHOD OF STORAGE DEVICE AND OPERATING METHOD OF STORAGE SYSTEM INCLUDING STORAGE DEVICE

CROSS-REFERENCE TO RELATED APPLICATION

This application is based on and claims priority under 35 U.S.C. § 119 to Korean Patent Application No. 10-2022-0149352, filed on Nov. 10, 2022, and Korean Patent Application No. 10-2023-0027964, filed on Mar. 2, 2023, in the Korean Intellectual Property Office, the disclosures of which are incorporated by reference herein in their entirety.

BACKGROUND

The inventive concepts relate to an operating method of a storage device, and more particularly, to an operating method of a storage device changing a device parameter according to a request from an authorized host and an operating method of a storage system including the storage device and a host.

Storage devices such as universal flash storage (UFS) and embedded multimedia card (eMMC) have been widely used. For security reasons, a storage device includes parameters having a one-time writable property, and the parameters may not be changed once written, thus lowering the reuse rate of the storage device in the process of manufacturing a storage system including the storage device. Thus, there is a need for a method by which a host may change the parameters while an end user from changing the parameters.

SUMMARY

Some example embodiments of the inventive concepts provide a method and/or apparatus by which a host may change parameters having a one-time writable property while preventing an end user from changing the parameters.

The inventive concepts provide an operating method of a storage device capable of changing a parameter having a one-time writable property for security reasons through authentication of a host and an operating method of a storage system including the storage device.

According to some example embodiments of the inventive concepts, there is provided an operating method of a storage device including a nonvolatile memory device and a storage controller configured to communicate with a host and control the nonvolatile memory device, the operating method including storing, by the storage controller, a public key received from a first host, transmitting, by the storage controller, a random number to a second host in response to a host authentication start request from the second host that has obtained the public key and a private key corresponding to the public key, receiving, by the storage controller, a signature generated based on the private key and the random number from the second host, verifying, by the storage controller, the signature based on the public key, and changing, by the storage controller, a first device parameter according to a request from the second host in response to the signature being verified.

According to some example embodiments of the inventive concepts, there is provided an operating method of a storage device configured to communicate with a host, the operating method including receiving, by a storage controller included in the storage device, a public key from the host, storing, by the storage controller, the public key in a key storage area, transmitting, by the storage controller, a random number to the host in response to a host authentication request from the host, receiving, by the storage controller, a signature generated based on the random number and a private key corresponding to the public key from the host, verifying, by the storage controller, the signature based on the public key, and changing, by the storage controller, a first device parameter in response to the signature being verified.

According to some example embodiments of the inventive concepts, there is provided an operating method of a storage system including a host and a storage device, the operating method including obtaining, by the host, a public key corresponding to the storage device and a private key corresponding to the public key, transmitting, by the host, the public key to the storage device, storing, by the storage device, the public key, transmitting, by the storage device, a random number to the host in response to a host authentication start request received from the host, generating, by the host, a signature based on the private key and the random number, transmitting, by the host, the signature to the storage device, verifying, by the storage device, the signature based on the public key, and changing, by the storage device, a first device parameter according to a request from the host in response to the signature being verified.

According to some example embodiments of the inventive concepts, there is provided an operating method of a storage device configured to communicate with a host, the operating method including receiving, by the storage device, a public key from a first host, storing, by the storage device, the public key in a key storage area, transmitting a random number to a second host in response to a host authentication request from the second host, receiving a signature generated based on the random number and a private key corresponding to the public key from the second host, verifying the signature based on the public key, and resetting a plurality of keys stored in the storage device according to a request from the second host in response to the signature being verified, the plurality of keys including the public key.

BRIEF DESCRIPTION OF THE DRAWINGS

Some example embodiments will be more clearly understood from the following detailed description taken in conjunction with the accompanying drawings in which:

FIG. 2 is a flowchart illustrating an operating method of a storage device according to some example embodiments;

FIG. 3 is a flowchart illustrating an operation between a host and a storage device according to some example embodiments;

FIG. 7A illustrates a command block for a public key setting command and FIG. 7B illustrates a data block for data corresponding to the public key setting command, according to some example embodiments;

FIG. 8A illustrates a command block for a public key setting command and FIG. 8B illustrates a data block for data corresponding to the public key setting command, according to some example embodiments;

FIG. 9A illustrates a command block for an authentication command and FIG. 9B illustrates a data block for data corresponding to the authentication command, according to some example embodiments;

FIG. 11A illustrates a command block for a reset all key command and FIG. 11B illustrates a data block for data corresponding to the reset all key command, according to some example embodiments;

FIG. 16 is a block diagram illustrating a UFS system according to some example embodiments;

FIG. 17 is a diagram for describing a 3D VNAND structure applicable to a UFS device according to some example embodiments; and FIG. 18 is a diagram for describing a B-VNAND structure applicable to a UFS device according to some example embodiments.

DETAILED DESCRIPTION

Hereinafter, some example embodiments will be described in detail with reference to the accompanying drawings.

When the words "about" and "substantially" are used in this application in connection with a numerical value, it is intended that the associated numerical value include a tolerance of ±10% around the stated numerical value, unless otherwise explicitly defined. Further, regardless of whether numerical values are modified as "about" or "substantially," it will be understood that these values should be construed as including a tolerance of ±10% around the stated numerical value.

Figure 1:
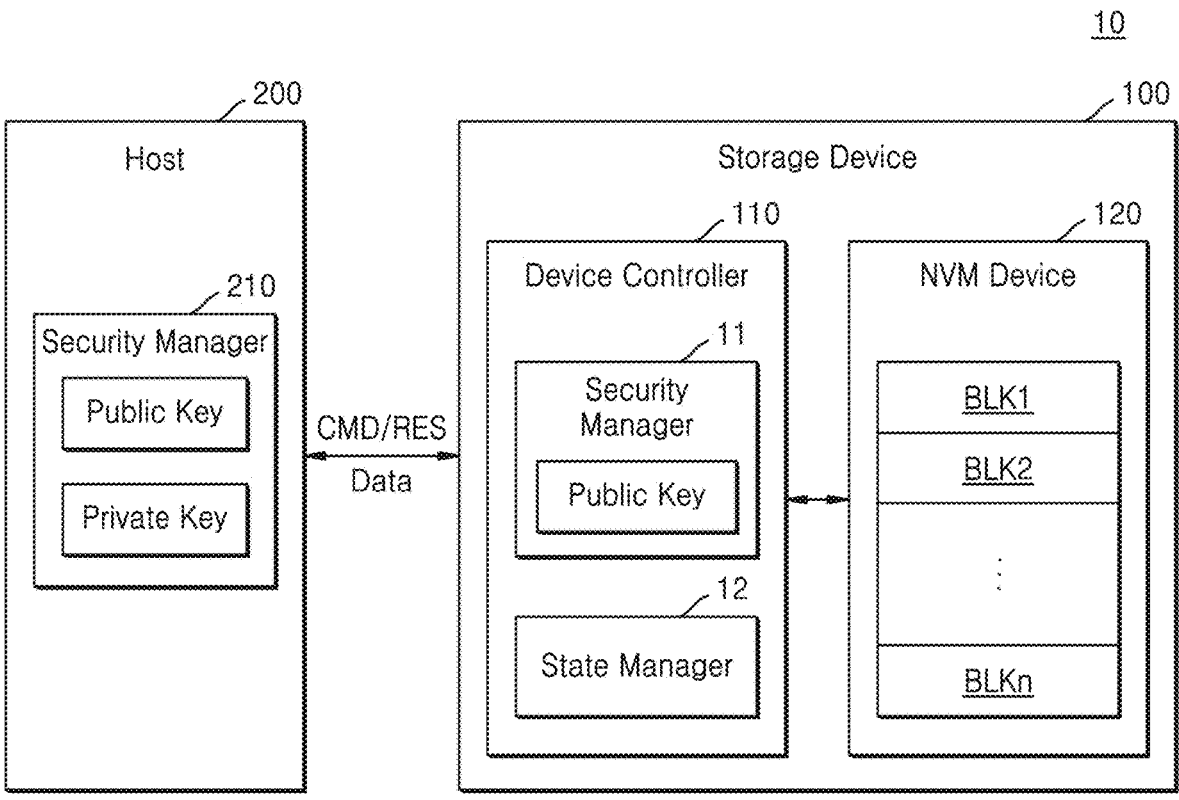
FIG. 1 is a block diagram illustrating a storage system according to some example embodiments.

FIG. 1 is a block diagram illustrating a storage system according to some example embodiments.

Referring to FIG. 1, a storage system 10 may include a storage device 100 and/or a host 200. The storage system 10 may include one of data storage devices such as a mobile phone, smart phone, a MP3 player, a laptop computer, a desktop computer, a game machine, a television (TV), tablet personal computer (PC), and/or an in-vehicle infotainment system.

The host 200 may refer to a data processing device capable of processing data, such as a central processing unit (CPU), a processor, a microprocessor, and/or an application processor (AP). The host 200 may execute an operating system (OS) and/or various application programs (applications). In some example embodiments, the storage system 10 may be included in a mobile device, and the host 200 may be implemented as an application processor (AP). In some example embodiments, the host 200 may be implemented as a system-on-chip (SoC) and accordingly may be embedded in an electronic device.

The host 200 may communicate with the storage device 100 through various interfaces. For example, the storage device 100 and the host 200 may be connected to each other according to the interface protocol defined in the universal flash storage (UFS) standard, and accordingly, the storage device 100 may be a UFS device and the host 200 may be a UFS host. However, the inventive concepts are not limited thereto, and the storage device 100 and the host 200 may be connected to each other according to various standard interfaces.

The host 200 may control a data processing operation of the storage device 100, such as a data read operation or a data write operation (or a storage operation). The host 200 may transmit data and a command CMD for requesting a data processing operation of the storage device 100 to the storage device 100, and the storage device 100 may perform a data operation according to the command CMD and transmit a response RES representing the operation result thereof to the host 200. The host 200 may transmit a command CMD related to a general operation of the storage device 100, such as a read command or a write command, and the host 200 may transmit a command CMD according to the security protocol of an interface with the storage device 100, such as a security input command or a security output command for providing a security function of the storage device 100. The storage device 100 may transmit, to the host 200, data generated by performing an operation according to a request from the host 200 or read from a nonvolatile memory (NVM) device 120.

The host 200 may include a security manager 210, and the security manager 210 may provide a security function in the communication between the host 200 and the storage device 100. The security manager 210 may generate a security command and/or data and provide the same to the storage device 100 and may perform an operation for a security function based on a response RES and/or data received from the storage device 100.

The security manager 210 may obtain a public key having a unique value for the storage device 100 and a private key (or referred to as a secret key) corresponding to the public key. For example, the security manager 210 may generate a public key and/or a private key. As another example, the security manager 210 may receive a public key and/or a private key generated for the storage device 100 by another host. For example, a public key and/or a private key generated by the host 200 (or another host) may be managed in a separate server, and when a host connected to the storage device 100 is changed, the changed host may receive the public key and/or the private key from the server.

The security manager 210 may include a key storage (e.g., 211 of FIG. 6) implemented as a nonvolatile memory element, and the security manager 210 may store the public key and/or the private key in the key storage.

The security manager 210 may transmit the public key and/or the private key to the storage device 100 based on the security command and thereafter authenticate, based on the public key and/or the private key, that the host 200 has valid control authority.

The storage device 100 may be manufactured as any one of various types of storage devices according to a host interface that is a communication method with the host 400. For example, the storage device 100 may include any one of various types of storage devices such as solid state drives (SSDs), MMC, eMMC, RS-MMC, or micro-MMC type multimedia cards, SD, mini-SD, or micro-SD type secure digital cards, Universal Storage Bus (USB) storage devices, Universal Flash Storage (UFS) devices, Personal Computer Memory Card International Association (PCMCIA) card type storage devices, Peripheral Component Interconnection (PCI) card type storage device, PCI Express (PCI-E) card type storage device, Compact Flash (CF) cards, smart media cards, and/or memory sticks.

The storage device 100 may be manufactured as any one of various types of packages. For example, the storage device 100 may be manufactured as any one of various types of packages such as package-on-package (POP), system-in-package (SIP), system-on-chip (SOC), multi-chip package (MCP), chip-on-board (COB), wafer-level fabricated package (WFP), and/or wafer-level stack package (WSP).

The storage device 100 may include a device controller 110 (or referred to as storage controller) and/or a nonvolatile memory (NVM) device 120. The device controller 110 may control the nonvolatile memory device 120 to write data into the nonvolatile memory device 120 in response to a write request from the host 200 and/or may control the nonvolatile memory device 120 to read data stored in the nonvolatile memory device 120 in response to a read request from the host 200.

The nonvolatile memory device 120 may include a plurality of memory cells; for example, the plurality of memory cells may be flash memory cells. In some example embodiments, the plurality of memory cells may be NAND flash memory cells. However, the inventive concepts are not limited thereto, and in some example embodiments, the plurality of memory cells may be resistive memory cells such as resistive RAM (ReRAM), phase change RAM (PRAM), and/or magnetic RAM (MRAM).

Each, or one or more, of the memory cells may include a single-level cell (SLC) capable of storing one data bit, a multi-level cell (MLC) capable of storing two data bits, a triple-level cell (TLC) capable of storing three data bits, and/or a quad-level Cell (QLC) capable of storing four data bits.

The nonvolatile memory device 120 may include a plurality of memory blocks, for example, first to n-th memory blocks BLK1 to BLKn (where "n" is an integer greater than or equal to 2). Each, or one or more, memory block may include a plurality of memory cells. Each, or one or more, memory block may include a plurality of pages. In some example embodiments, the page may be a unit of storing data in the nonvolatile memory device 120 or reading data stored in the nonvolatile memory device 120. The memory block may be a unit of erasing data.

The device controller 110 of the storage device 100 according to some example embodiments may include a security manager 11 and/or a state manager 12. The security manager 11 may store a public key received from the host 200. For example, the security manager 11 may store a public key in a key storage (e.g., 1 of FIG. 6) implemented as a nonvolatile memory, and when a host authentication request is received from the host 200, host authentication may be performed based on the public key.

The state manager 12 may manage the states (e.g., initial state, locked state, and/or unlocked state) of the storage device 100. When the public key received from the host 200 is stored in the storage, the storage device 100 may change the state of the storage device 100 from the initial state to the locked state. When the host authentication succeeds, the state manager 12 may change the state of the storage device 100 from the locked state to the unlocked state or from the locked state to the initial state.

Parameters for setting an operation of the storage device 100 may be stored in the storage device 100. For example, the parameters may be stored in a particular area of the nonvolatile memory device 120 and/or a nonvolatile memory included in the device controller 110. The parameters may have one of various properties such as a read-only property, a one-time writable property, and/or a read and write property. The storage device 100 may change a one-time writable parameter (hereinafter referred to as a first parameter) in the unlocked state or the initial state. For example, the storage device 100 may initialize the first parameter. In this case, the initialization may mean invalidating the value of the first parameter that has already been written. In some example embodiments, the first parameter may be a value set by the host 200 and may include a RPMB key used for authentication for access to a replay protection memory block (RPMB), a set value used for partitioning the nonvolatile memory device 120, and/or the like.

In the storage system 10 according to some example embodiments, the host 200 may generate a public key having a unique value for the storage device 100 and/or a private key corresponding to the public key, and the storage device 100 may perform host authentication based on the public key received from the host 200 and may change the state of the storage device 100 and also change the first parameter according to a request of the host 200 that has been authenticated. The storage device 100 may change the first parameter according to a request from the host 200 while preventing the end user from changing the first parameter.

FIG. 2 is a flowchart illustrating an operating method of a storage device according to some example embodiments.

The method of FIG. 2 may be performed in the storage device 100 (see FIG. 1), and the operation of the storage device 100 described above with reference to FIG. 1 may also be applied to some example embodiments.

Referring to FIG. 2, the storage device 100 may receive a public key from the host 200 (see FIG. 1) (operation S101). The public key may be generated by the host 200 or obtained by the host 200 from another host.

The storage device 100 may store the received public key (operation S102). The storage device 100 may store the public key in a nonvolatile memory, for example, in a particular area of the nonvolatile memory device 120 (see FIG. 1) and/or in a nonvolatile memory included in the device controller 110. In response to storing the public key, the state of the storage device 100 may be changed from the initial state to the locked state.

The storage device 100 may transmit a random number to the host 200 in response to an authentication start request from the host 200 (operation S103). In response to an authentication start request from the host 200, the storage device 100 may generate a random number and transmit the random number to the host 200. As an example, the random number may be 32 bytes of data.

The storage device 100 may receive a signature (or referred to as a digital signature) generated based on a private key and the random number from the host 200 (operation S104). In some example embodiments, the host 200 may generate a hash value by processing the random number received from the storage device 100 based on a hash algorithm (or a hash function) and encrypt the hash value by using the private key. The storage device 100 may receive the hash algorithm used to generate the hash value together with the random number.

The storage device 100 may verify the signature based on the public key (operation S105). The storage device 100 may verify the signature based on the public key stored in operation S102. In some example embodiments, the storage device 100 may generate a first hash value by decrypting the signature based on the public key and generate a second hash value by processing the random number based on the hash algorithm received together with the signature. The storage device 100 may verify the signature by comparing the first hash value with the second hash value. When the first hash value and the second hash value are equal to each other, the storage device 100 may determine that the signature verification and host authentication have succeeded.

The storage device 100 may change the first device parameter according to a request from the host 200 when the signature verification succeeds, that is, when the host authentication succeeds (operation S106). As described with reference to FIG. 1, the first device parameter may be a one-time writable set value. In some example embodiments, when the host is authenticated, the state of the storage device 100 may be changed from the locked state to the unlocked state. The storage device 100 may change the first device parameter in the unlocked state. In some example embodiments, when the host is authenticated, the storage device 100 may be changed from the locked state to the initial state in response to a security command from the host 200. For example, the security command may be a key reset command, and the keys stored in the storage device 100 including the public key may be reset in the initial state.

Figure 3:
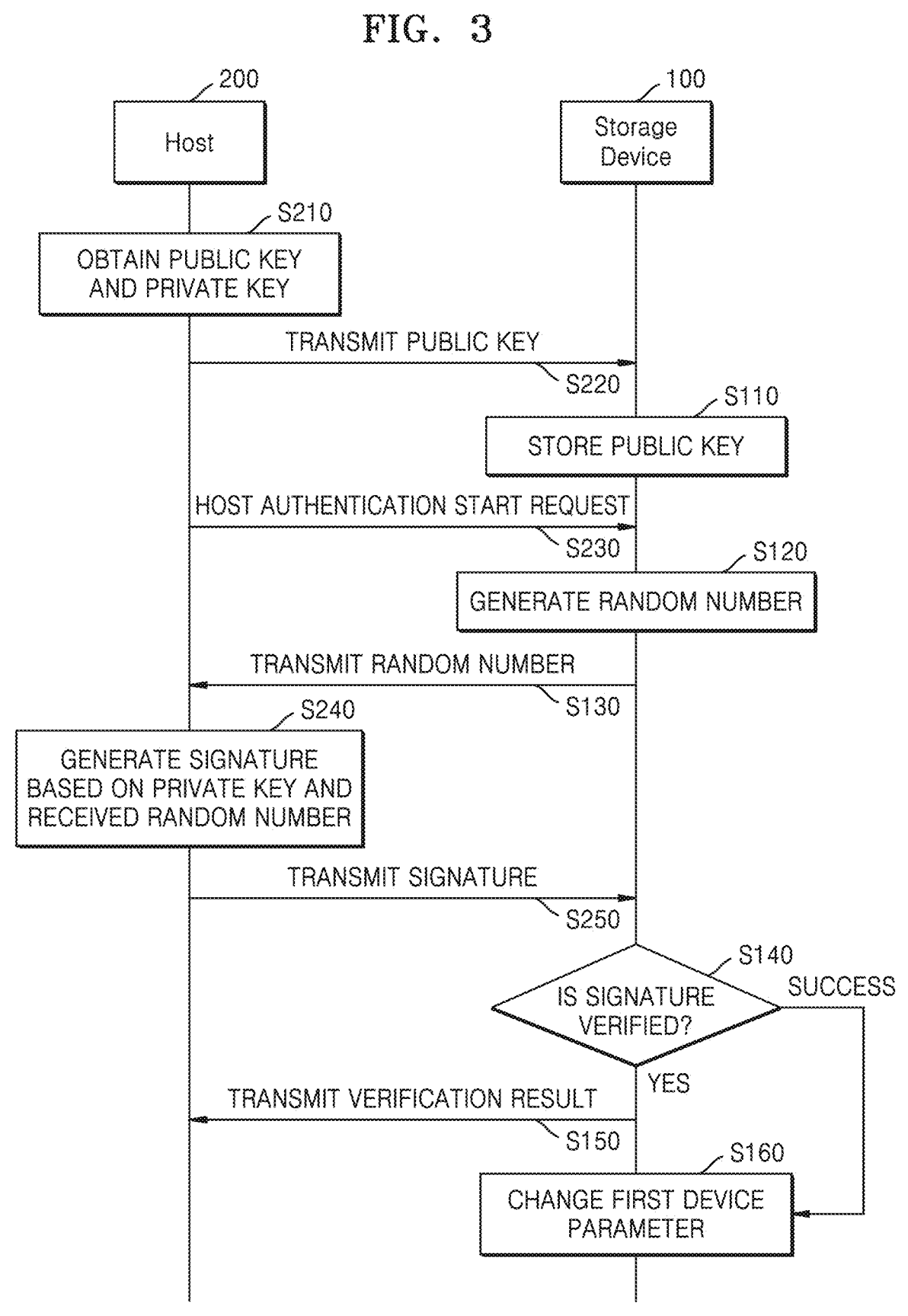

FIG. 3 is a flowchart illustrating an operation between a host and a storage device according to some example embodiments. The flowchart of FIG. 3 illustrates the operation between the host 200 and the storage device 100 of FIG. 1, and the description of the operation of the host 200 and the storage device 100 given above with reference to FIGS. 1 and 2 may also be applied to some example embodiments.

Referring to FIG. 3, the host 200 may obtain a public key and a private key (operation S210). In some example embodiments, the host 200 may generate a public key having a unique value for the storage device 100 and/or a private key corresponding to the public key. In some example embodiments, a public key and/or a private key may be generated in another host to which the storage device 100 is connected, and the host 200 may receive the public key and/or the private key generated in the other host. For example, a public key and/or a private key may be managed in a separate server to which the host 200 may be connected by wire or wireless, and the host 200 may receive the public key and/or the private key from the server.

The host 200 may transmit the public key to the storage device 100 (operation S220). In some example embodiments, the host 200 may transmit the public key to the storage device 100 together with a security command for requesting to set the public key (public key setting).

The storage device 100 may store the public key received from the host 200 (operation S110). As described above with reference to FIG. 2, as the storage device 100 stores the public key, the state of the storage device 100 may be changed from the initial state to the locked state.

Thereafter, the host 200 may transmit a host authentication start request to the storage device 100 (operation S230). In some example embodiments, the host 200 may transmit a challenge command to the storage device 100. In response to the host authentication start request from the host 200, the storage device 100 may generate a random number (operation S120) and transmit the random number to the host 200 (operation S130).

The host 200 may generate a signature based on the received random number and the private key (operation S240). The host 200 may transmit the signature to the storage device 100. In some example embodiments, the host 200 may transmit the signature to the storage device 100 together with a command indicating an authentication request. In some example embodiments, the host 200 may transmit the signature to the storage device 100 together with a security command indicating a particular security operation, such as a key clear command.

The storage device 100 may verify the signature based on the public key (operation S140). The storage device 100 may transmit a verification result, for example, a verification success or fail, to the host 200 (operation S150). When the signature verification succeeds, that is, when host authentication is performed indicating that the host 200 is a host having the authority to control the storage device 100, the storage device 100 may change the first device parameter (operation S160). Here, the control of the storage device 100 may include the control of the security function of the storage device 100 as well as the read and write function of the storage device 100.

In some example embodiments, the storage device 100 may be changed from the locked state to the unlocked state, and the storage device 100 may change the first device parameter in the unlocked state. As described above, the first device parameter may have a one-time writable property. For example, the first device parameter may be an RPMB key.

In some example embodiments, the storage device 100 may be changed from the locked state to the initial state. The first device parameter may include a plurality of keys stored in the storage device 100 including the public key, and the plurality of keys may be reset as the storage device 100 is changed to the initial state. For example, the key values of the plurality of keys may be invalidated.

Figure 4A:
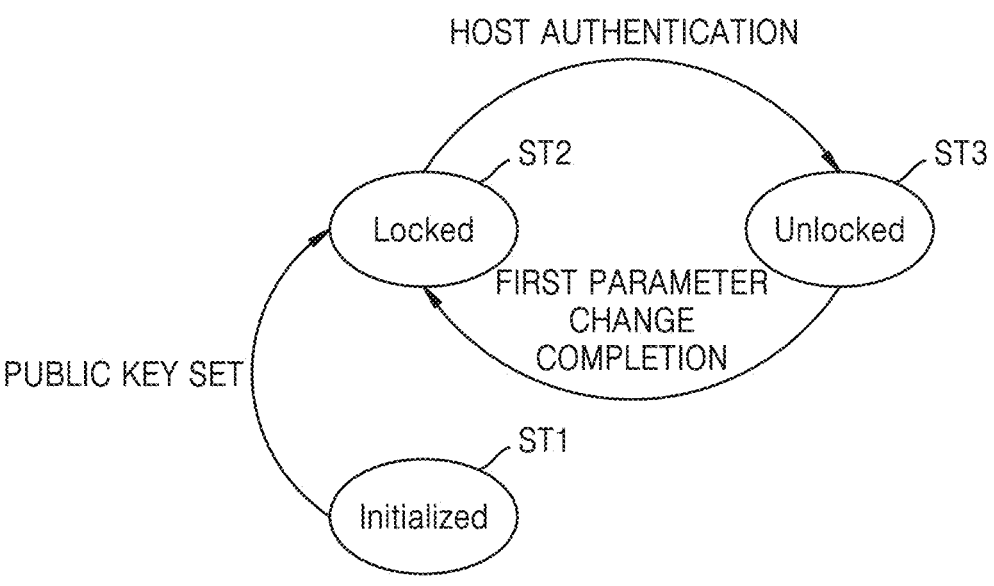
FIGS. 4A and 4B illustrate the switch between states of a storage device according to some example embodiments.
Figure 4B:
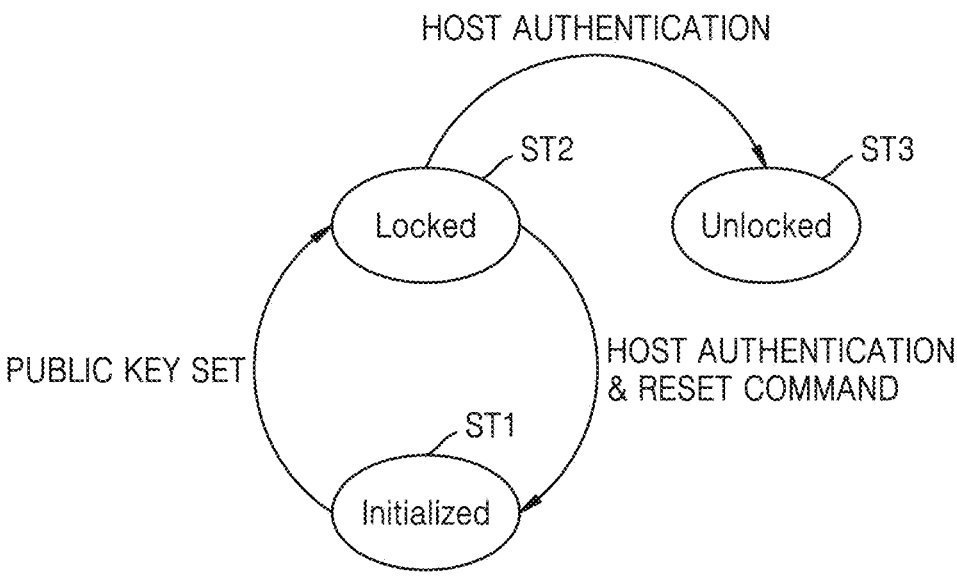

FIGS. 4A and 4B illustrate the switch between states of a storage device according to some example embodiments.

Referring to FIGS. 4A and 4B, the storage device 100 (see FIG. 1) may include an initial state ST1, a locked state ST2, and/or an unlocked state ST3. The initial state ST1 may represent a state in which parameters of the storage device are not set, that is, a state in which the parameters are reset. The locked state ST2 may be a state in which access to or change of security parameters related to security settings including the first parameter is impossible (or not allowed). The unlocked state ST3 may be a state in which access to and change of the security parameters including the first parameter are possible (or allowed).

Referring to FIG. 4A, as the public key is set in the storage device 100, that is, as the storage device 100 stores the public key received from the host 200, the storage device 100 may be changed from the initial state ST1 to the locked state ST2. Thereafter, as the host 200 connected to the storage device 100 is authenticated, the storage device 100 may be changed from the locked state ST2 to the unlocked state ST3. The first parameter may be changed in the unlocked state ST3. Here, the first parameter may be changed according to the request of the host 200. When the change of the first parameter is completed, the storage device 100 may be again change to the locked state ST2.

Referring to FIG. 4B, after the storage device 100 is changed from the initial state ST1 to the locked state ST2 according to the public key setting, the storage device 100 may be changed from the locked state ST2 to the initial state ST1 in response to a host authentication and reset command. For example, in operation S250 of FIG. 3, the host 200 may transmit the signature together with a reset command to the storage device 100, and the storage device 100 may be changed from the locked state ST2 to the initial state ST1 according to the reset command as the host is authenticated through the signature verification. For example, the reset command may be a security command and may include a reset all key command for requesting to reset all the keys. In the initial state ST1, a plurality of keys stored in the storage device 100 may be reset.

Figure 5:
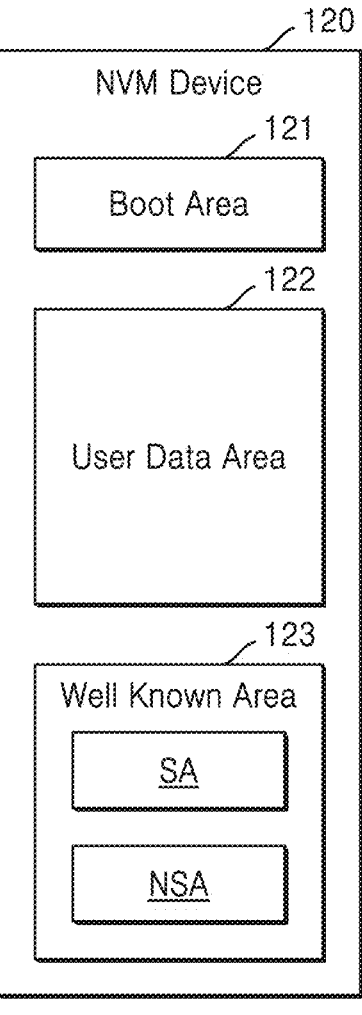
FIG. 5 schematically illustrates storage areas of a nonvolatile memory device according to some example embodiments.

FIG. 5 schematically illustrates storage areas of a nonvolatile memory device according to some example embodiments.

Referring to FIG. 5, the nonvolatile memory device 120 may include a boot area 121, a user data area 122, and a well-known area 123. Each, or one or more, of the boot area 121, the user data area 122, and/or the well-known area 123 may include at least one logic unit.

The boot area 121 may include basic information necessary, or sufficient, to configure a file system. In some example embodiments, the boot area 121 may include information necessary, or sufficient, for the file system to access the volume. For example, the boot area 121 may include a loader necessary, or sufficient, for an operating system operating the storage system 10 (see FIG. 1), and the boot area 121 may load a kernel file of the operating system.

The user data area 122 may store user data. For example, the user data area 122 may store data requested to be stored in the storage device 100 from the host 200 (see FIG. 1).

The well-known area 123 may store data (e.g., commands and/or parameters) for performing a particular function defined for the SCSI and/or UFS standard. Parameters including the first device parameter of the storage device 100 may be stored in the well-known area 123. The data stored in the well-known area 123 may be changed (or reset) when the storage device 100 becomes the unlocked state or the initial state by the host authentication as described above. In some example embodiments, the well-known area 123 may include an RPMB logic unit, and the RPMB logic unit may include an RPMB key. The RPMB key may be changed or initialized when the storage device 100 becomes the unlocked state or the locked state.

Figure 6:
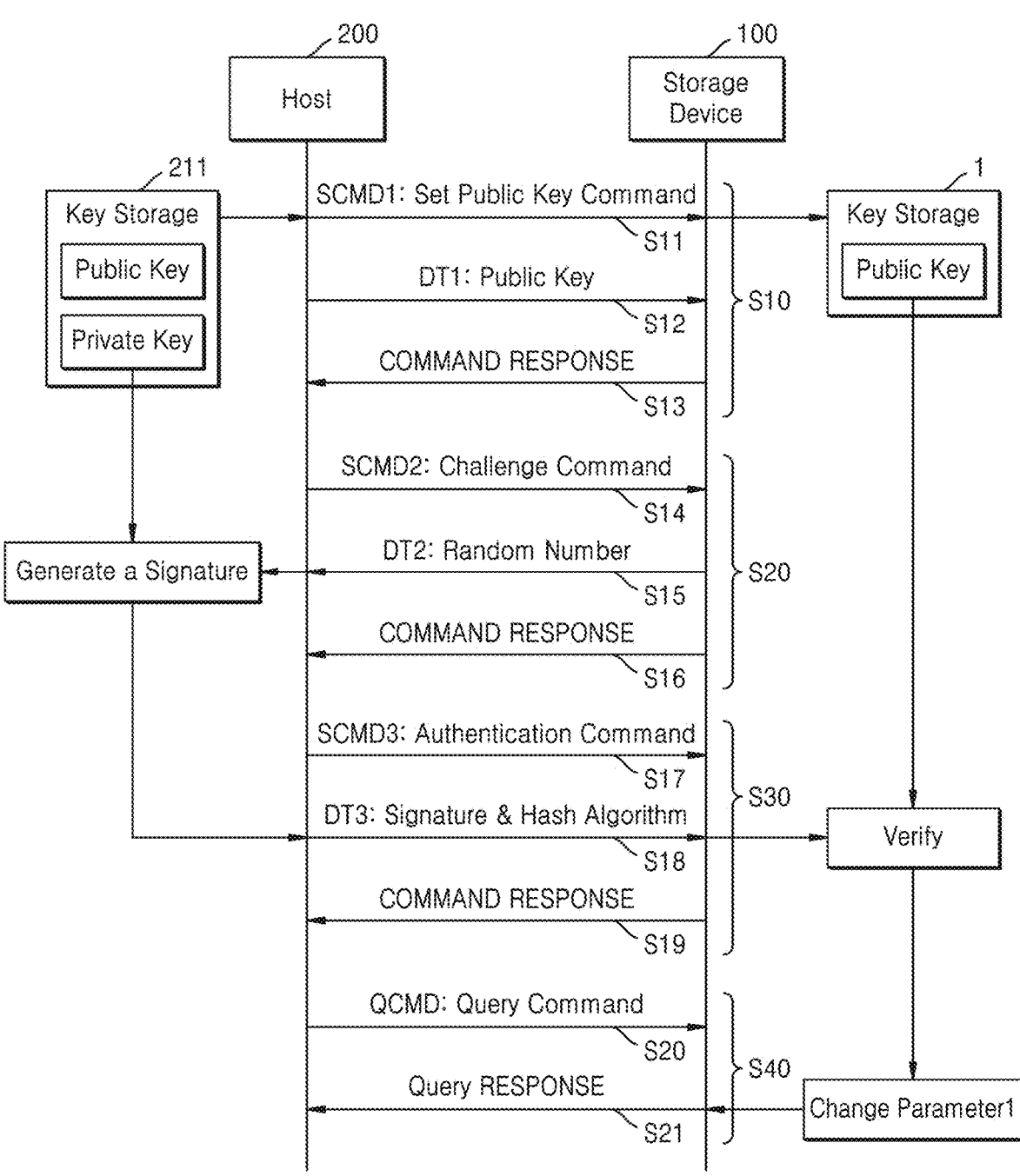
FIG. 6 is a flowchart illustrating a command and response transmission operation between a host and a storage device according to some example embodiments.

FIG. 6 is a flowchart illustrating a command and response transmission operation between a host and a storage device according to some example embodiments. The description of the operation of the host 200 and the storage device 100 given with reference to FIGS. 1 to 5B may also be applied to some example embodiments. For convenience of description, some components and operations of the host 200 and the storage device 100 will be represented together.

Referring to FIG. 6, the host 200 and the storage device 100 may respectively include key storages 211 and 1, and the host 200 may store the public key and/or the private key in the key storage 211. A plurality of operations, for example, operations S10, S20, S30, and/or S40, may be respectively performed in response to commands transmitted from the host 200 to the storage device 100 in order to set the public key and authenticate the host based on the public key.

In operation S10, the host 200 may transmit a first security command SCMD1 to the storage device 100 (operation S11), wherein the first security command SCMD1 may indicate data output and may be a public key setting command (Set Public Key Command) for requesting the storage device 100 to set the public key. Here, the first security command SCMD1 and security commands described below, for example, a second security command SCMD2 and/or a third security command SMCD3, may be defined according to the security protocol according to the interface method between the storage device 100 and the host 200.

The host 200 may transmit first data DT1 to the storage device 100 as output data corresponding to the first security command SCMD1 (operation S12). The first data DT1 may include the public key.

The storage device 100 may store the public key in the key storage 1 in response to the first security command SCMD1 received from the host 200. Accordingly, the public key may be set.

In response to the first security command SCMD1, the storage device 100 may transmit, to the host 200, a command response indicating that the public key has been set (operation S13).

In operation S20, the host 200 may transmit a second security command SCMD2 for requesting to start host authentication (a host authentication start) to the storage device 100 (operation S14). The second security command SCMD2 may be a data input command, that is, a command for requesting data from the storage device 100. In some example embodiments, the second security command SCMD2 may include a challenge command. In response to the second security command SCMD2, the storage device 100 may generate a random number and transmit second data DT2 including the random number to the host 200 (operation S15). Also, the storage device 100 may transmit, to the host 200, a command response indicating that the response to the second security command SCMD2 has been completed (operation S16).

The host 200 may generate a signature (digital signature) based on the public key and the random number received from the storage device 100. Thereafter, in operation S30, the host 200 may transmit a third security command SCMD3 for requesting host authentication to the storage device 100 (operation S17). The third security command SCMD3 may be a data output command, and in some example embodiments, the third security command SCMD3 may be an authentication command for requesting authentication based on data transmitted to the storage device 100 together with the third security command SCMD3. The host 200 may transmit third data DT3 corresponding to the third security command SCMD3 to the storage device 100 (operation S18). The third data DT3 may include the signature generated by the host 200 and may also include a hash algorithm (or a hash function) used to generate the signature. The storage device 100 may verify the signature based on the received hash function and the public key stored in the key storage 1. The storage device 100 may transmit a command response including the verification result to the host 200 (operation S19). As described above, when the verification succeeds, that is, when the host is authenticated, the storage device 100 may be changed to the unlocked state.

In operation S40, when the command response received in operation S19 includes a verification success, the host 200 may transmit a query command QCMD for requesting to change the first parameter to the storage device 100 (operation S20). In the unlocked state, the storage device 100 may change the first parameter in response to the query command QCMD. For example, the query command QCMD may include an RPMB key reset command, and the storage device 100 may reset the RPMB key in response to the RPMB key reset command. The storage device 100 may transmit, to the host 200, a query response indicating that the first parameter has been changed according to the query command QCMD (operation S21).

Accordingly, the storage system 10 according to example embodiments may allow the storage device 100 to change the first parameter according to a request from the host 200 without use of a separate firmware. Therefore, the storage system 10 according to example embodiments may increase reuse of the storage device 100 and/or increasing security of the storage device 100.

FIG. 7A illustrates a command block for a public key setting command (Set Public Key Command) and FIG. 7B illustrates a data block for data corresponding to the public key setting command, according to some example embodiments.

Referring to FIG. 7A, a first command block CDB1 may be a command block for the challenge command and may be implemented in 12 bytes (e.g., 0th to 11th bytes).

The 0th byte may be an operation code and may have a value of B5h. The 1st byte may be a code representing the security protocol and may have a value of ECh. The 2nd and 3rd bytes may be a code specific to the security protocol and may respectively have values of 01h and 10h. The 7th bit of the 4th byte may represent INC_512 and may have a value of 0b. The 6th to 9th bytes may represent a transfer length, and the 11th byte may be a control byte and may be set to "00h" and not be used. The 0th to 6th bits of the 4th byte, the 5th byte, and the 10th byte may be reserved.

Referring to FIG. 7B, a first data block DB1 may be a data block for data corresponding to the public key setting command. The first data block DB1 may include at least 4 bytes (e.g., 0th to 3rd bytes). The 0th byte may include a tag, the 1st and 2nd bytes may represent the length of the data, and at least one byte including the 3rd byte may include the value of the public key.

FIG. 8A illustrates a command block for a public key setting command (Set Public Key Command) and FIG. 8B illustrates a data block for data corresponding to the public key setting command, according to some example embodiments.

Referring to FIG. 8A, a second command block CDB2 may be a command block for the public key setting command and may be implemented in 12 bytes (e.g., 0th to 11th bytes). Each, or one or more, of the bytes may include 7 bits (e.g., 0th to 7th bits).

The 0th byte may be an operation code and may have a value of A2h. The 1st byte may be a code representing the security protocol and may have a value of ECh. The 2nd and 3rd bytes may be a code specific to the security protocol and may respectively have values of 02h and 10h. The 4th to 11th bytes may be the same as the 4h to 11th bytes of the first command block CDB1 of FIG. 7A.

Referring to FIG. 8B, a second data block DB2 may be a data block for data corresponding to the challenge command. The second data block DB2 may include 32 bytes (e.g., 0th to 31st bytes). Each, or one or more, of the 0th to 31st bytes may include a random number.

FIG. 9A illustrates a command block for an authentication command and FIG. 9B illustrates a data block for data corresponding to the authentication command, according to some example embodiments.

Referring to FIG. 9A, a third command block CDB3 may be a command block for the authentication command and may be implemented in 12 bytes (e.g., 0th to 11th bytes).

The 0th byte may be an operation code and may have a value of B5h. The 1st byte may be a code representing the security protocol and may have a value of ECh. The 2nd and 3rd bytes may be a code specific to the security protocol and may respectively have values of 03h and 10h. The 4th to 11th bytes may be the same as the 4h to 11th bytes of the first command block CDB1 of FIG. 7A.

Referring to FIG. 9B, a third data block DB3 may be a data block for data corresponding to the authentication command. The third data block DB3 may include at least 4 bytes (e.g., 0th to 3rd bytes). The 0th byte may include a hash algorithm (or a hash function), the 1st and 2nd bytes may represent the length of the data, and at least one byte including the 3rd byte may include the value of the signature.

Figure 10:
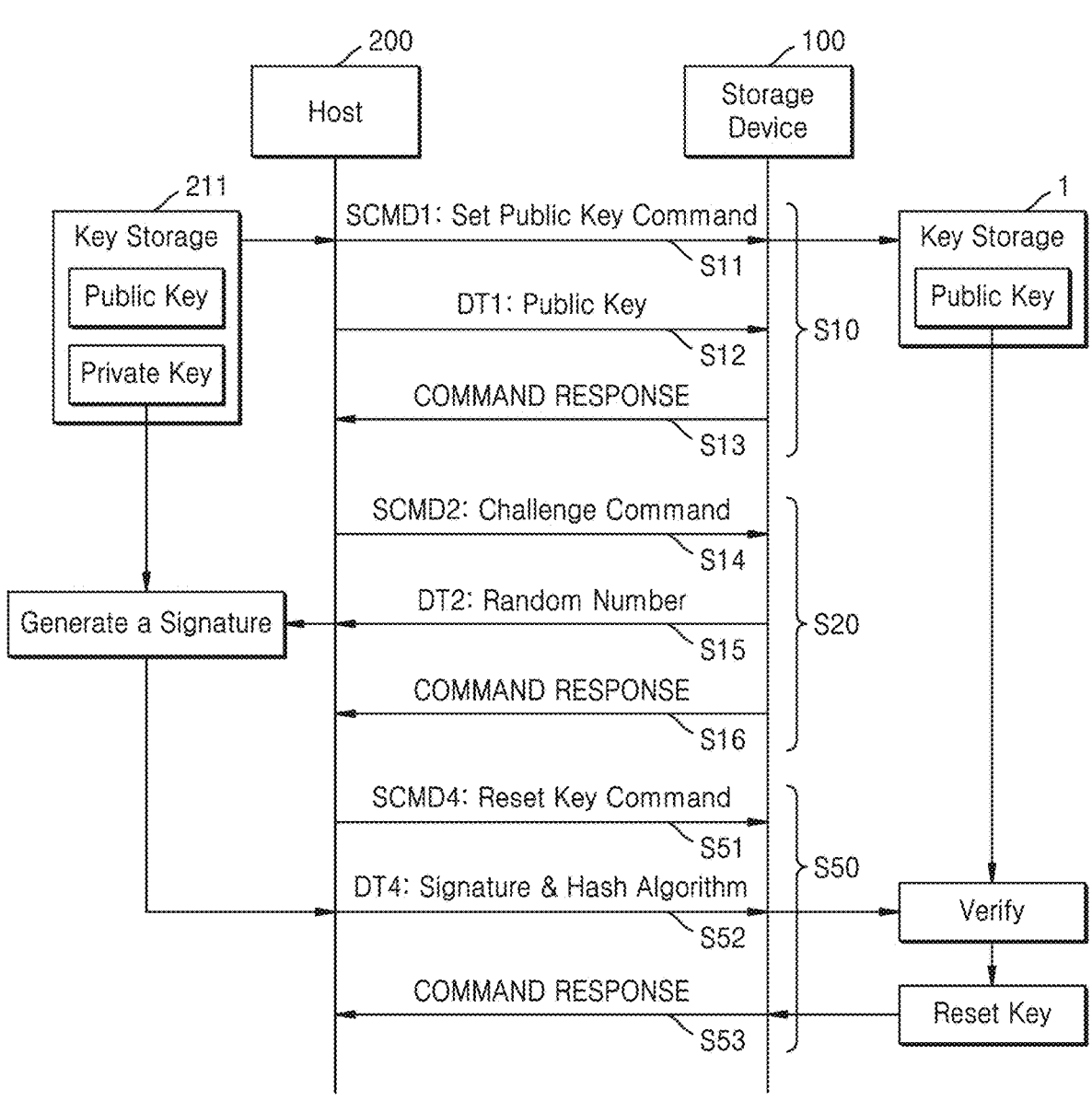
FIG. 10 is a flowchart illustrating a command and response transmission operation between a host and a storage device according to some example embodiments.

FIG. 10 is a flowchart illustrating a command and response transmission operation between a host and a storage device according to some example embodiments. The description of the operation of the host 200 and the storage device 100 given with reference to FIGS. 1 to 5B may also be applied to some example embodiments. For convenience of description, some components and operations of the host 200 and the storage device 100 will be represented together.

Referring to FIG. 10, the host 200 and the storage device 100 may respectively include key storages 211 and 1, and the host 200 may store the public key and/or the private key in the key storage 211. A plurality of operations, for example, operations S10, S20, and/or S50, may be respectively performed in response to commands transmitted from the host 200 to the storage device 100 in order to set the public key and authenticate the host based on the public key. Operations S10 and S20 may be the same as operations S10 and S20 of FIG. 6. Thus, redundant descriptions thereof will be omitted for conciseness.

In operation S50, the host 200 may transmit a fourth security command SCMD4 to the storage device 100 (operation S51). The fourth security command SCMD4 may be a command indicating data output and may include, for example, a reset key command (or a reset all key command). The host 200 may transmit fourth data DT4 corresponding to the fourth security command SCMD4 to the storage device 100 (operation S52). The fourth data DT4 may include the signature generated by the host 200 and may also include the hash algorithm (or the hash function) used to generate the signature. The storage device 100 may verify the signature based on the received hash function and/or the public key stored in the key storage 1. The storage device 100 may reset all, or one or more, keys (e.g., the public key and/or authentication keys) stored in the key storage 1. In other words, all, or one or more, keys stored in the key storage 1 may be invalidated. The storage device 100 may transmit, to the host 200, a command response indicating that the keys have been reset (operation S53). In some example embodiments, in response to the command response indicating that the storage device 100 has reset the keys of the key storage 1, the host 200 may reset the keys stored in the key storage 211, for example, the public key, the private key, and authentication keys. In some example embodiments, the host 200 may control the storage device 100 to set a public key by newly generating a public key and/or a private key and providing the public key to the storage device 100 according to operation S10.

FIG. 11A illustrates a command block for a reset all key command and FIG. 11B illustrates a data block for data corresponding to the reset all key command, according to some example embodiments.

Referring to FIG. 11A, a fourth command block CDB4 may be implemented in 12 bytes (e.g., 0th to 11th bytes).

The 0th byte may be an operation code and may have a value of B5h. The 1st byte may be a code representing the security protocol and may have a value of ECh. The 2nd and 3rd bytes may be a code specific to the security protocol and may respectively have values of 04h and 10h. The 4th to 11th bytes may be the same as the 4h to 11th bytes of the first command block CDB1 of FIG. 7A.

Referring to FIG. 11B, a fourth data block DB4 may be a data block for data corresponding to the reset all key command. The fourth data block DB4 may include at least 4 bytes (e.g., 0th to 3rd bytes). The 0th byte may include a hash algorithm (or a hash function), the 1st and 2nd bytes may represent the length of the data, and at least one byte including the 3rd byte may include the value of the signature.

Figure 12:
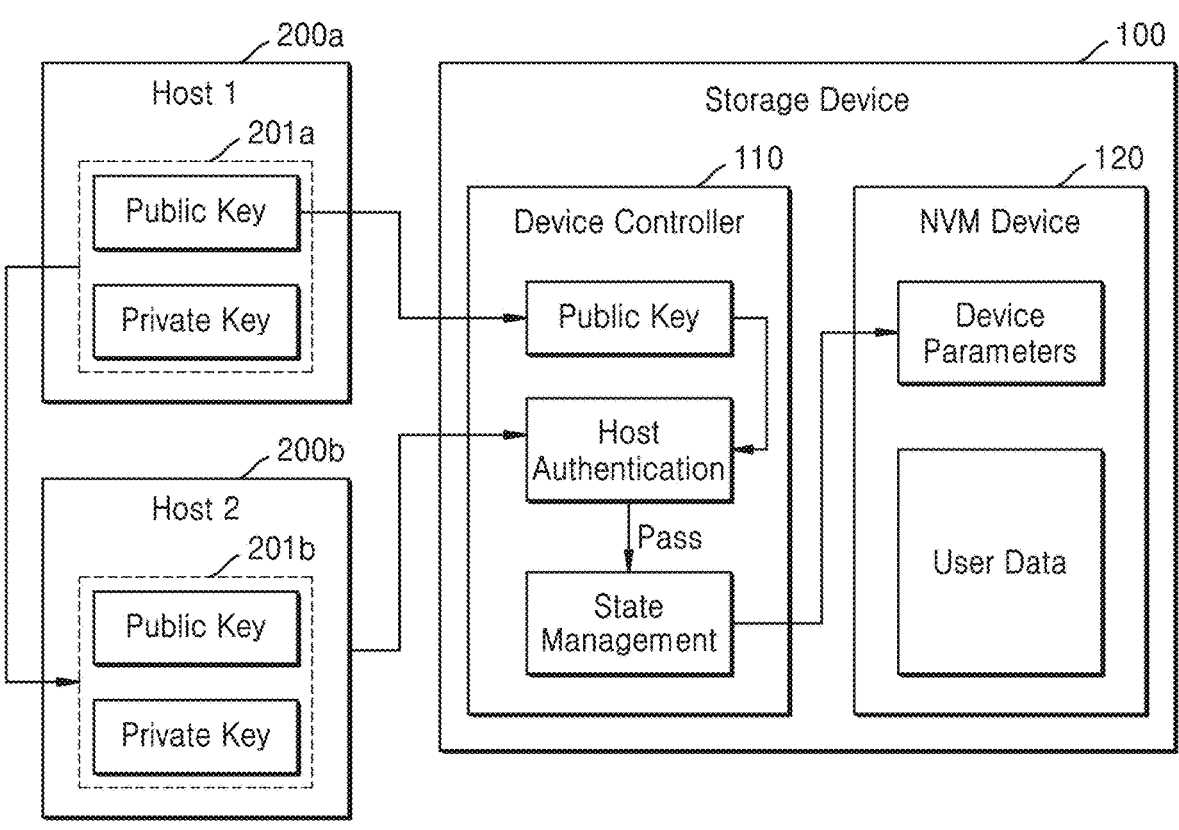
FIG. 12 illustrates an operation of a storage device according to some example embodiments.

FIG. 12 illustrates an operation of a storage device according to some example embodiments.

Referring to FIG. 12, the storage device 100 may be connected to a first host 200a. The first host 200a may generate a private key and/or a public key having a unique value for the storage device 100 and store the generated keys in a key storage 201a. The storage device 100 may receive the public key from the first host 200a and store the public key.

Thereafter, the storage device 100 may be connected to a second host 200b after the connection with the first host 200a is terminated. The second host 200b may obtain the public key and/or the private key generated by the first host 200a and store the obtained keys in a key storage 201b. The storage device 100 may perform a host authentication operation, for example, operations S20, S30, and/or S30 of FIG. 6 and operations S20 and/or S50 of FIG. 10, together with the second host 200b.

For example, even when the host connected to the storage device 100 is changed, the second host 200b may obtain the public key and/or the private key generated by the first host 200a, and the storage device 100 may perform host authentication based on the public key and/or the private key according to the request of the second host 200b and change the first parameter when the host is authenticated. Accordingly, the reuse rate of the storage device 100 may be increased.

Figure 13:
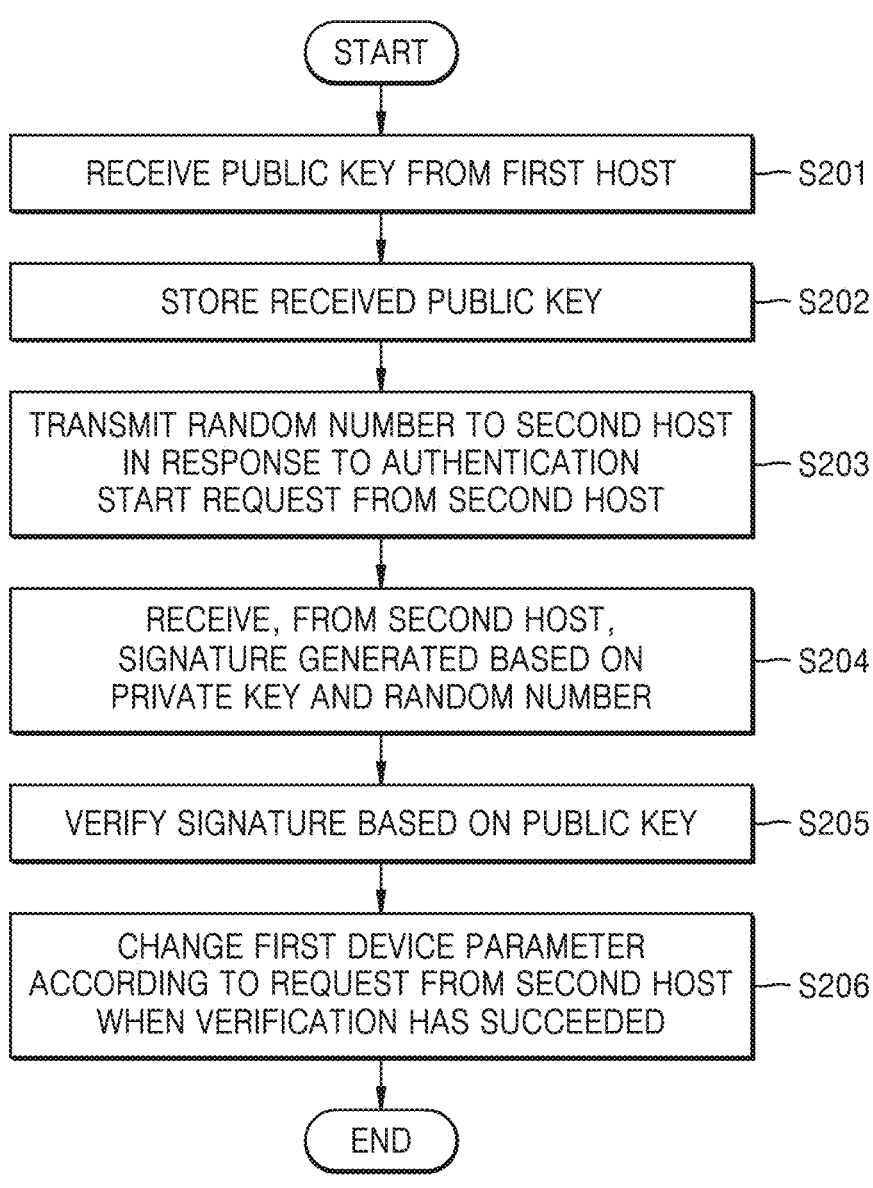
FIG. 13 is a flowchart illustrating an operating method of a storage device according to some example embodiments.

FIG. 13 is a flowchart illustrating an operating method of a storage device according to some example embodiments.

The method of FIG. 13 may be performed in the storage device 100 (see FIG. 1), and the operation of the storage device 100 described above may also be applied to some example embodiments.

Referring to FIG. 13, the storage device 100 may receive the public key from the first host 200a (see FIG. 12) (operation S201). The public key may be generated by the host 200 or obtained by the host 200 from another host.

The storage device 100 may store the received public key (operation S202). The storage device 100 may store the public key in a nonvolatile memory, and the state of the storage device 100 may be changed from the initial state to the locked state in response to storing the public key.

The storage device 100 may transmit a random number to the second host 200b in response to an authentication start request from the second host 200b (see FIG. 12) (operation S203). In response to an authentication start request from the second host 200b, the storage device 100 may generate a random number and transmit the random number to the host 200. As an example, the random number may be 32 bytes of data.

The storage device 100 may receive a signature (or referred to as a digital signature) generated based on the private key and the random number from the second host 200b (operation S204). In some example embodiments, the second host 200b may generate a hash value by processing the random number received from the storage device 100 based on a hash algorithm (or a hash function) and encrypt the hash value by using the private key. The storage device 100 may receive the hash algorithm used to generate the hash value together with the random number.

The storage device 100 may verify the signature based on the public key (operation S205). The storage device 100 may change the first device parameter according to a request from the host 200 when the signature verification succeeds, that is, when the host authentication succeeds (operation S206). As described with reference to FIG. 1, the first device parameter may be a one-time writable set value. In some example embodiments, when the host is authenticated, the state of the storage device 100 may be changed from the locked state to the unlocked state. The storage device 100 may change the first device parameter in the unlocked state. In some example embodiments, when the host is authenticated, the storage device 100 may be changed from the locked state to the initial state in response to a security command from the second host 200b. For example, the security command may be a key reset command, and the keys stored in the storage device 100 including the public key may be reset in the initial state.

Figure 14:
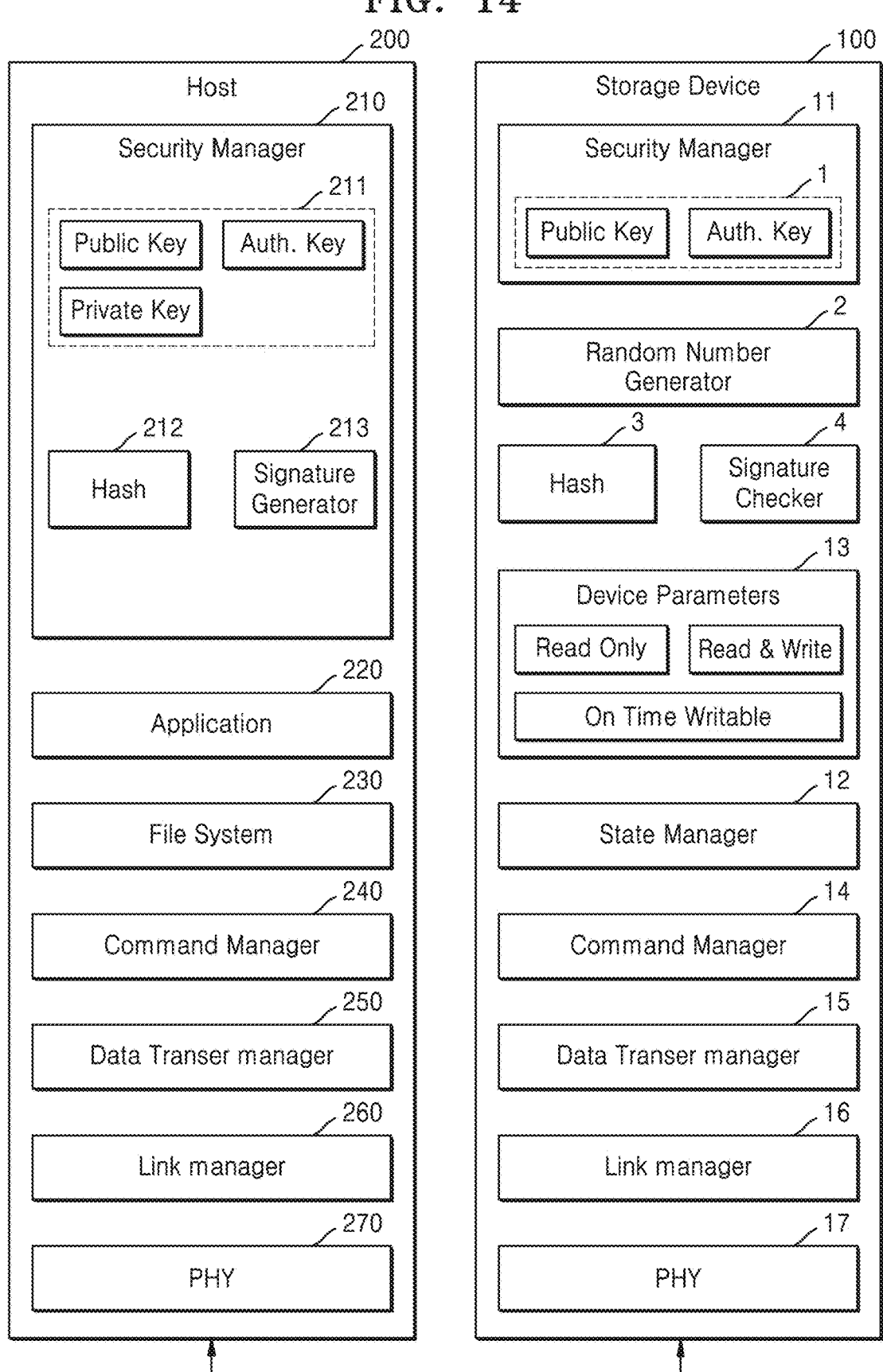
FIG. 14 illustrates a software layer of a host and a storage device according to some example embodiments.

FIG. 14 illustrates a software layer of a host and a storage device according to some example embodiments.

Referring to FIG. 14, the host 200 may include a security manager 210, an application 220, a file system 230, a command manager 240, a data transfer manager 250, a link manager 260, and/or a physical layer (PHY) (270).

The security manager 210 may provide a security function in the communication between the host 200 and the storage device 100. The security manager 210 may include a key storage 211 storing a public key, a private key, and/or other authentication keys, a hash processor 212 generating a hash value (e.g., a first hash value) based on a hash algorithm, and/or a signature generator 213 generating a signature based on the private key and the random number received from the storage device 100.

The application 220 executed in the host 200 may access the storage device 100 through the file system 230. The command manager 240 may generate a command indicating an access request when the application 220 intends to access the storage device 100 (or another external device). The data transfer manager 250 may control data communication with the storage device 100, the link manager 260 may control connection management with the storage device 100, and the physical layer 270 may manage physical data communication with the storage device 100.

The storage device 100 may include a security manager 11, device parameters 13, a state manager 12, a command manager 14, a data transfer manager 15, a link manager 16, and/or a physical layer 17.

The security manager 11 may include a key storage 1 storing a public key and other authentication keys received from the host 200, a random number generator 2 generating a random number in response to an authentication start request from the host 200, a hash processor 3 generating a hash value (e.g., a second hash value) by processing the random number based on the hash algorithm received from the host 200, and/or a signature checker 4 verifying the signature from the host 200.

The device parameters 13 may include parameters with various properties, such as parameters having a read-only property, parameters having a one-time writable property, and/or parameters having a read and write property.

The state manager 12 may manage the state of the storage device 100 (e.g., the initial state, the locked state, and the unlocked state) and/or the state of the device parameters 13. As described above, when the public key received from the host 200 is stored in the storage, the state manager 120 may change the state of the storage device 100 from the initial state to the locked state. When the host authentication succeeds, the state manager 12 may change the state of the storage device 100 from the locked state to the unlocked state or from the locked state to the initial state. The state manager 12 may set or reset (or initialize) the device parameters 13.

The command manager 14 may interpret a command received from the host 200 and control the storage device 100 to perform an operation according to the command. The data transfer manager 15 may control data communication with the host 200, the link manager 16 may control connection management with the host 200, and the physical layer 17 may manage physical data communication with the host 200.

Figure 15:
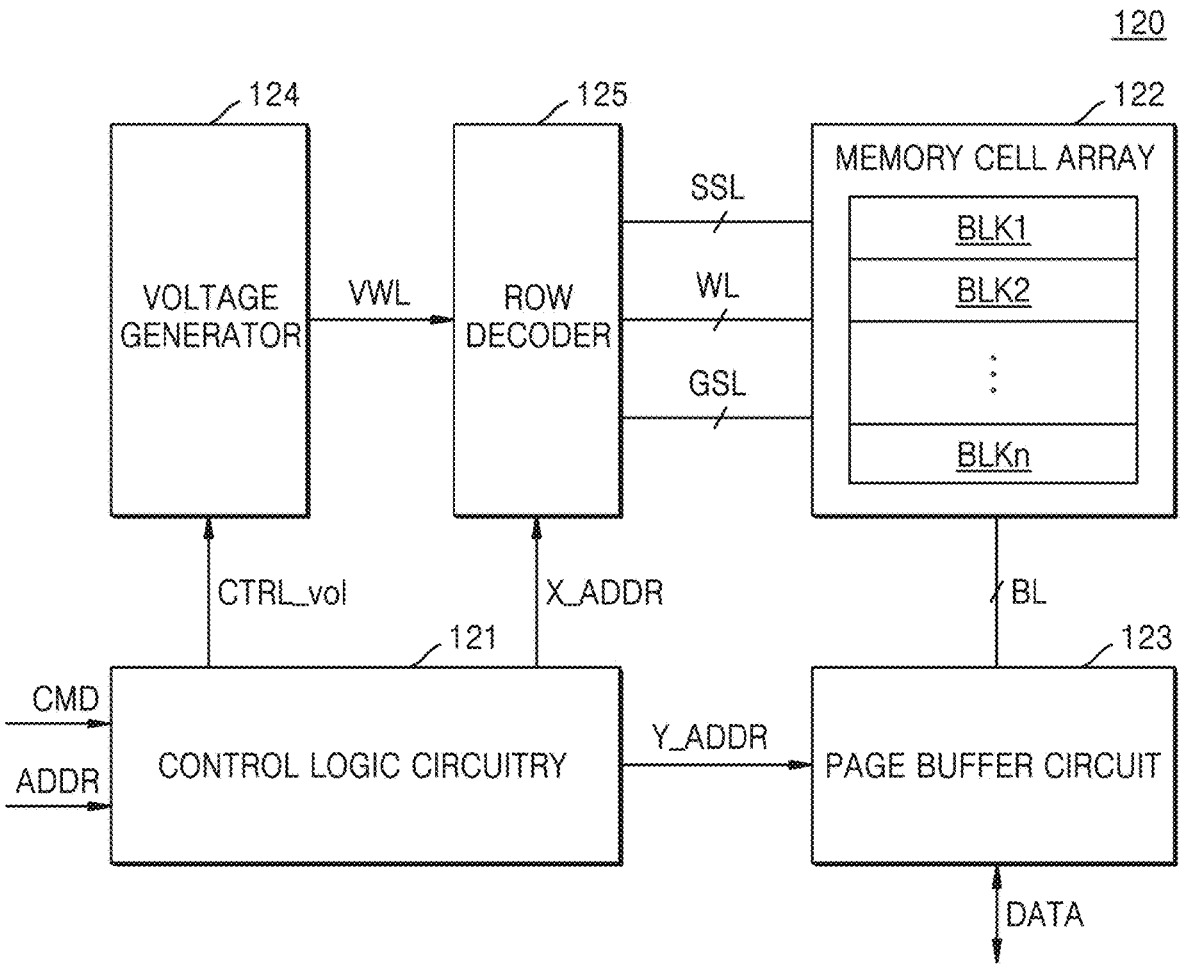
FIG. 15 is a block diagram illustrating a nonvolatile memory device according to some example embodiments.

FIG. 15 is a block diagram illustrating a nonvolatile memory device according to some example embodiments.

Referring to FIG. 15, the nonvolatile memory device 120 may include a control logic circuit 121, a memory cell array 122, a page buffer circuit 123, a voltage generator 124, and/or a row decoder 125. Although not illustrated in FIG. 15, the nonvolatile memory device 120 may further include a memory interface circuit and also may further include a command decoder, an address decoder, and/or the like.

The control logic circuit 121 may generally control various operations in the nonvolatile memory device 120. The control logic circuit 121 may output various control signals in response to a command CMD and/or an address ADDR received from the device controller 110 (see FIG. 1). For example, the control logic circuit 121 may output a voltage control signal CTRL_vol, a row address X_ADDR, and a column address Y_ADDR.

The memory cell array 122 may include a plurality of memory blocks BLK1 to BLKn (where n is a positive integer), and each, or one or more, of the plurality of memory blocks BLK1 to BLKn may include a plurality of memory cells. The memory cell array 122 may be connected to the page buffer circuit 125 through bit lines BL and may be connected to the row decoder 124 through word lines WL, string selection lines SSL, and/or ground selection lines GSL.

In some example embodiments, the memory cell array 122 may include a three-dimensional (3D) memory cell array, and the 3D memory cell array may include a plurality of NAND strings. Each, or one or more, NAND string may include memory cells respectively connected to word lines vertically stacked on a substrate. U.S. Pat. Nos. 7,679,133, 8,553,466, 8,654,587, 8,559,235, and U.S. Patent Application Publication No. 2011/0233648 are incorporated herein in their entirety by reference. In some example embodiments, the memory cell array 122 may include a two-dimensional (2D) memory cell array, and the 2D memory cell array may include a plurality of NAND strings arranged in the row and column directions.

The page buffer circuit 123 may include a plurality of page buffers, and the plurality of page buffers may be respectively connected to the memory cells through a plurality of bit lines BL. The page buffer circuit 123 may select at least one bit line among the bit lines BL in response to the column address Y_ADDR. The page buffer circuit 123 may operate as a write driver or as a sense amplifier according to an operation mode. For example, in a program operation, the page buffer circuit 123 may apply a bit line voltage corresponding to data to be programmed, to the selected bit line. In a read operation, the page buffer circuit 123 may detect data stored in the memory cell by sensing the current or voltage of the selected bit line.

The voltage generator 124 may generate various types of voltages for performing program, read, and/or erase operations based on the voltage control signal CTRL_vol. For example, the voltage generator 124 may generate a program voltage, a read voltage, a program verify voltage, an erase voltage, and/or the like as a word line voltage VWL.

The row decoder 125 may select one of a plurality of word lines WL and one of a plurality of string selection lines SSL in response to the row address X_ADDR. For example, the row decoder 125 may apply a program voltage and a program verify voltage to the selected word line in a program operation and may apply a read voltage to the selected word line in a read operation.

Referring to FIGS. 1 and 15 together, the memory cell array 122 may store a plurality of parameters including the first parameter. When the storage device 100 (see FIG. 1) becomes the unlocked state, the first parameter may be reset. In other words, the first parameter may be set to invalid data.

FIG. 16 is a block diagram illustrating a UFS system according to some example embodiments.

A UFS system 1000 may be a system conforming to the UFS standard announced by the Joint Electron Device Engineering Council (JEDEC) and may include a UFS host 1100, a UFS device 1200, and/or a UFS interface 1300. The above description of the storage system 10 of FIG. 1 may also be applied to the UFS system 1000 of FIG. 16 within the range of not conflicting with the following description given with reference to FIG. 16.

Referring to FIG. 16, the UFS host 1100 and the UFS device 1200 may be interconnected through the UFS interface 1300. When the host 200 of FIG. 1 is an application processor, the UFS host 1100 may be implemented as a portion of the application processor. The UFS device 1200 may correspond to the storage device 100 of FIG. 1, and a UFS device controller 1210 and a nonvolatile memory 1220 may respectively correspond to the device controller 110 and the nonvolatile memory device 120 of FIG. 1. In the UFS system 1000, the UFS host 1100 may generate a public key having a unique value for the UFS device 1200 and a private key corresponding to the public key, and the UFS device 1200 may perform host authentication based on a public key received from the UFS host 1100, change the state of the UFS device 1200 according to a request of the authenticated UFS host 1100, and change a one-time writable parameter (a first parameter) in an unlocked state or an initial state. Accordingly, while reducing, or preventing, the end user from changing the first parameter, the first parameter may be changed according to a request from the UFS host 1100.

The UFS host 1100 may include a UFS host controller 1110, an application 1120, a UFS driver 1130, a host memory 1140, and/or a UFS interconnect (UIC) layer 1150. The UFS device 1200 may include a UFS device controller 1210, a nonvolatile memory 1220, a storage interface 1230, a device memory 1240, a UIC layer 1250, and/or a regulator 1260. The nonvolatile memory 1220 may include a plurality of memory units 1221, and the memory unit 1221 may include a 2D-structure and/or 3D-structure V-NAND flash memory and/or may also include other types of nonvolatile memories such as PRAM and/or RRAM. The UFS device controller 1210 and the nonvolatile memory 1220 may be connected to each other through the storage interface 1230. The storage interface 1230 may be implemented to comply with a standard protocol such as Toggle and/or Open NAND Flash Interface (ONFI).

The application 1120 may refer to a program that desires to communicate with the UFS device 1200 in order to use the function of the UFS device 1200. The application 1120 may transmit an input-output request (IOR) to the UFS driver 1130 for input/output with respect to the UFS device 1200. The input-output request (IOR) may refer to a read request, a write request, and/or a discard request for data; however, the inventive concepts are not limited thereto.

The UFS driver 1130 may manage the UFS host controller 1110 through a host controller interface (UFS-HCI). The UFS driver 1130 may convert an input/output request generated by the application 1120 into a UFS command defined by the UFS standard and transmit the UFS command to the UFS host controller 1110. One input/output request may be converted into a plurality of UFS commands. The UFS command may be a command basically defined by the SCSI standard or may be a command dedicated to the UFS standard.

The UFS host controller 1110 may transmit the UFS command generated by the UFS driver 1130 to the UIC layer 1250 of the UFS device 1200 through the UIC layer 1150 and the UFS interface 1300. In this process, a UFS host register 1111 of the UFS host controller 1110 may function as a command queue (CQ).

The UIC layer 1150 of the UFS host 1100 may include a MIPI M-PHY 1151 and/or a MIPI UniPro 1152, and the UIC layer 1250 of the UFS device 1200 may also include a MIPI M-PHY (1251) and/or a MIPI UniPro 1252.

The UFS interface 1300 may include a line for transmitting a reference clock REF_CLK, a line for transmitting a hardware reset signal RESET_n for the UFS device 1200, and a pair of lines for transmitting a pair of differential input signals DINT and DIN_C, and a pair of lines for transmitting a pair of differential output signals DOUT_T and DOUT_C.

The frequency value of a reference clock provided from the UFS host 1100 to the UFS device 1200 may be one of four values of 19.2 MHz, 26 MHz, 38.4 MHz, and/or 52 MHz; however, the inventive concepts are not limited thereto. The UFS host 1100 may change the frequency value of the reference clock even during operation, that is, even while data transmission/reception is performed between the UFS host 1100 and the UFS device 1200. By using a phase-locked loop (PLL) or the like, the UFS device 1200 may generate clocks of various frequencies from the reference clock received from the UFS host 1100. Also, the UFS host 1100 may set a value of a data rate between the UFS host 1100 and the UFS device 1200 based on the frequency value of the reference clock. That is, the value of the data rate may be determined depending on the frequency value of the reference clock.

The UFS interface 1300 may support a plurality of lanes, and each lane may be implemented as a differential pair. For example, the UFS interface 1300 may include one or more reception lanes and/or one or more transmission lanes. In FIG. 16, a pair of lines for transmitting a pair of differential input signals DIN_T and DIN_C may constitute a reception lane, and a pair of lines for transmitting a pair of differential output signals DOUT_T and DOUT_C may constitute a transmission lane. Although one transmission lane and one reception lane are illustrated in FIG. 16, the number of transmission lanes and reception lanes may be modified.

The reception lane and/or the transmission lane may transmit data by a serial communication method, and full-duplex communication between the UFS host 1100 and the UFS device 1200 may be performed by a structure in which the reception lane and the transmission lane are separated from each other. That is, the UFS device 1200 may transmit data to the UFS host 1100 through the transmission lane even while receiving data from the UFS host 1100 through the reception lane. Also, control data such as a command from the UFS host 1100 to the UFS device 1200 and user data, which the UFS host 1100 intends to store in the nonvolatile memory 1220 of the UFS device 1200 or to read from the nonvolatile memory 1220, may be transmitted through the same lane. Accordingly, a separate lane for data transmission other than a pair of reception lanes and a pair of transmission lanes may not need to be further provided between the UFS host 1100 and the UFS device 1200.

The UFS device controller 1210 of the UFS device 1200 may control an overall operation of the UFS device 1200. The UFS device controller 1210 may manage the nonvolatile memory 1220 through a logical unit (LU) 1211 that is a logical data storage unit. The number of LUs 1211 may be 8; however, the inventive concepts are not limited thereto. The UFS device controller 1210 may include a flash translation layer (FTL), and a logical data address such as a logical block address (LBA) received from the UFS host 1100 may be converted into a physical data address such as a physical block address (PBA) by using address mapping information of the FTL. In the UFS system 1000, a logical block for storing user data may have a size within a certain range. For example, the minimum size of the logical block may be set to 4 Kbytes.

When a command from the UFS host 1100 is input to the UFS device 1200 through the UIC layer 1250, the UFS device controller 1210 may perform an operation according to the input command and transmit a completion response to the UFS host 1100 when the operation is completed.

As an example, when the UFS host 1100 intends to store user data in the UFS device 1200, the UFS host 1100 may transmit a data storage command to the UFS device 1200. Upon receiving, from the UFS device 1200, a response indicating that the user data is ready to receive (ready-to-transfer), the UFS host 1100 may transmit the user data to the UFS device 1200. The UFS device controller 1210 may temporarily store the received user data in the device memory 1240 and store the user data temporarily stored in the device memory 1240, at a selected position of the nonvolatile memory 1220 based on the address mapping information of the FTL.

As another example, when the UFS host 1100 intends to read the user data stored in the UFS device 1200, the UFS host 1100 may transmit a data read command to the UFS device 1200. Upon receiving the data read command, the UFS device controller 1210 may read the user data from the nonvolatile memory 1220 based on the data read command and temporarily store the read user data in the device memory 1240. In this read process, the UFS device controller 1210 may detect and correct an error in the read user data by using an embedded error correction code (ECC) engine (not illustrated). More particularly, the ECC engine may generate parity bits for write data to be written in the nonvolatile memory 1220, and the generated parity bits may be stored in the nonvolatile memory 1220 together with the write data. When reading data from the nonvolatile memory 1220, the ECC engine may correct an error in the read data by using the parity bits read from the nonvolatile memory 2220 together with the read data and output the error-corrected read data.

Also, the UFS device controller 1210 may transmit the user data temporarily stored in the device memory 1240 to the UFS host 1100. Also, the UFS device controller 1210 may further include an advanced encryption standard (AES) engine (not illustrated). The AES engine may perform at least one of an encryption operation and/or a decryption operation on the data input into the UFS device controller 1210, by using a symmetric-key algorithm.

The UFS host 1100 may store commands to be transmitted to the UFS device 1200 in order in the UFS host register 1111, which may function as a command queue, and transmit the command to the UFS device 1200 in the order. In this case, even when the previously-transmitted command is still being processed by the UFS device 1200, that is, even before receiving a notification indicating that the previously-transmitted command has been completely, (or substantially), processed by the UFS device 1200, the UFS host 1100 may transmit a next command waiting in the command queue to the UFS device 1200, and accordingly, the UFS device 1200 may also receive the next command from the UFS host 1100 while processing the previously-transmitted command. The maximum number of commands (queue depth) that may be stored in the command queue may be, for example, 32. Also, the command queue may be implemented as a circular queue type that indicates the start and end of a command sequence stored in the queue through a head pointer and a tail pointer, respectively.

Each, or one or more, of the plurality of memory units 1221 may include a memory cell array (not illustrated) and/or a control circuit (not illustrated) controlling an operation of the memory cell array. The memory cell array may include a 2D memory cell array and/or a 3D memory cell array. The 3D memory cell array may include a vertical NAND string in which at least one memory cell is vertically oriented to be located over another memory cell.

As power voltages, VCC, VCCQ1, VCCQ2, and/or the like may be input to the UFS device 1200. VCC may be a main power voltage for the UFS device 1200 and may have a value of about 2.4 V to about 3.6 V. VCCQ1 may be a power voltage for supplying a low voltage, may be mainly for the UFS device controller 1210, and may have a value of about 1.14 V to about 1.26 V. VCCQ2 may be a power voltage for supplying a voltage that is lower than VCC but is higher than VCCQ1, may be mainly for the input/output interface such as the MIPI M-PHY 1251, and may have a value of about 1.7 V to about 1.95 V. The power voltages may be supplied to the respective components of the UFS device 1200 through the regulator 1260. The regulator 1260 may be implemented as a set of unit regulators respectively connected to different voltages among the power voltages described above.

Figure 17:
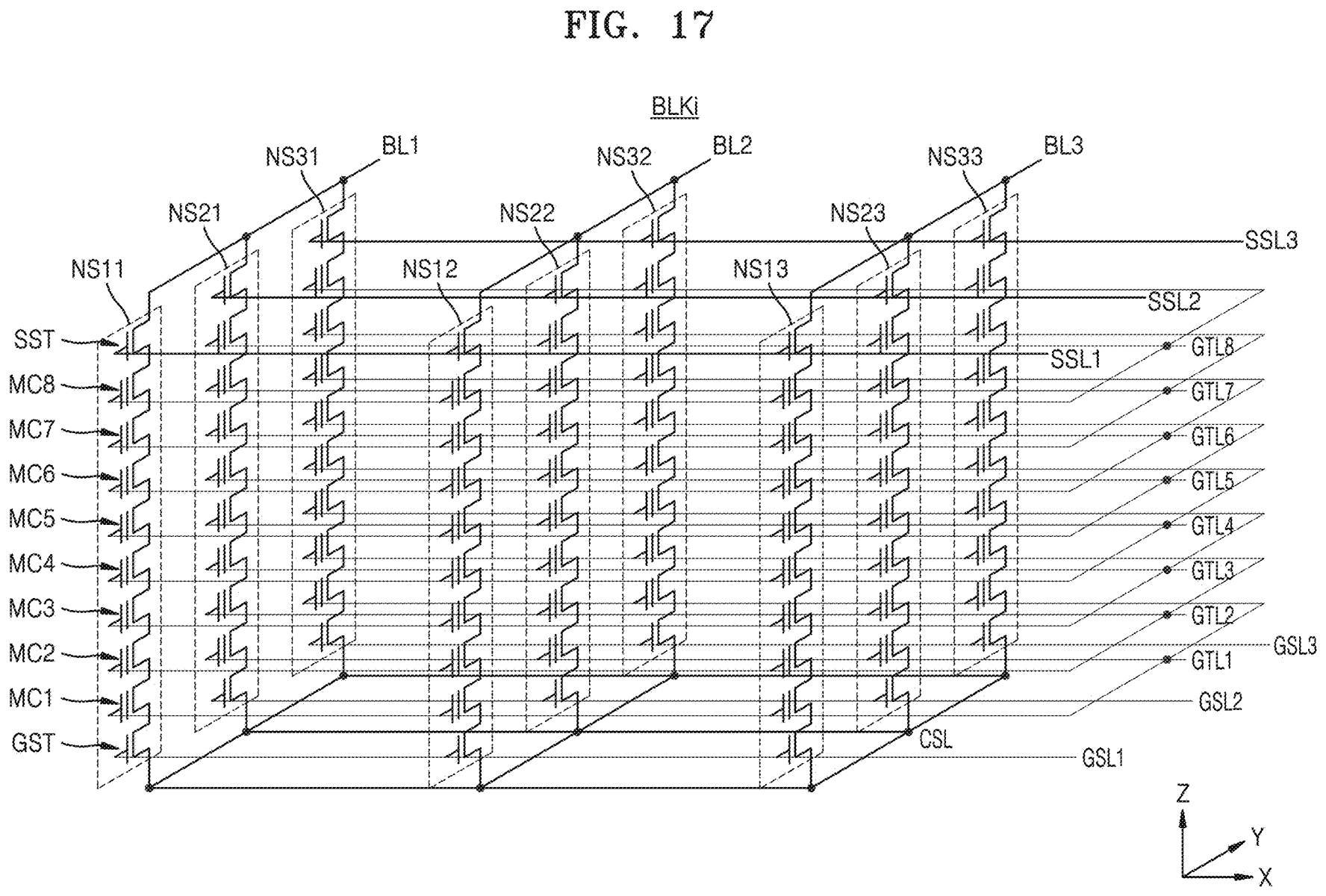

FIG. 17 is a diagram for describing a 3D VNAND structure applicable to a UFS device according to some example embodiments. When a storage module of the UFS device is implemented as a 3D vertical NAND (VNAND) type flash memory, each, or one or more, of a plurality of memory blocks constituting the storage module may be represented as an equivalent circuit illustrated in FIG. 17. A memory block BLKi illustrated in FIG. 17 may represent a 3D memory block formed in a 3D structure on a substrate. For example, a plurality of memory NAND strings included in the memory block BLKi may be formed in a direction perpendicular to the substrate.

Referring to FIG. 17, the memory block BLKi may include a plurality of memory NAND strings NS11 to NS33 connected between bit lines BL1, BL2, and/or BL3 and a common source line CSL. Each of the plurality of memory NAND strings NS11 to NS33 may include a string selection transistor SST, a plurality of memory cells MC1, MC2, . . . , MC8, and/or a ground selection transistor GST. Although FIG. 17 illustrates that each of the plurality of memory NAND strings NS11 to NS33 includes eight memory cells MC1, MC2, . . . , MC8, the inventive concepts are not limited thereto.

The string selection transistor SST may be connected to corresponding string selection lines SSL1, SSL2, and/or SSL3. The plurality of memory cells MC1, MC2, . . . , MC8 may be respectively connected to corresponding gate lines GTL1, GTL2, . . . , GTL8. The gate lines GTL1, GTL2, . . . , GTL8 may correspond to word lines, and some of the gate lines GTL1, GTL2, . . . , GTL8 may correspond to dummy word lines. The ground selection transistor GST may be connected to corresponding ground selection lines GSL1, GSL2, and/or GSL3. The string selection transistor SST may be connected to the corresponding bit lines BL1, BL2, and/or BL3, and the ground selection transistor GST may be connected to the common source line CSL.

Word lines (e.g., WL1) of the same height may be connected in common, and the ground selection lines GSL1, GSL2, and/or GSL3 and the string selection lines SSL1, SSL2, and/or SSL3 may be separated from each other. Although FIG. 17 illustrates that the memory block BLKi is connected to eight gate lines GTL1, GTL2, . . . , GTL8 and three bit lines BL1, BL2, and BL3, the inventive concepts are not limited thereto.

Figure 18:
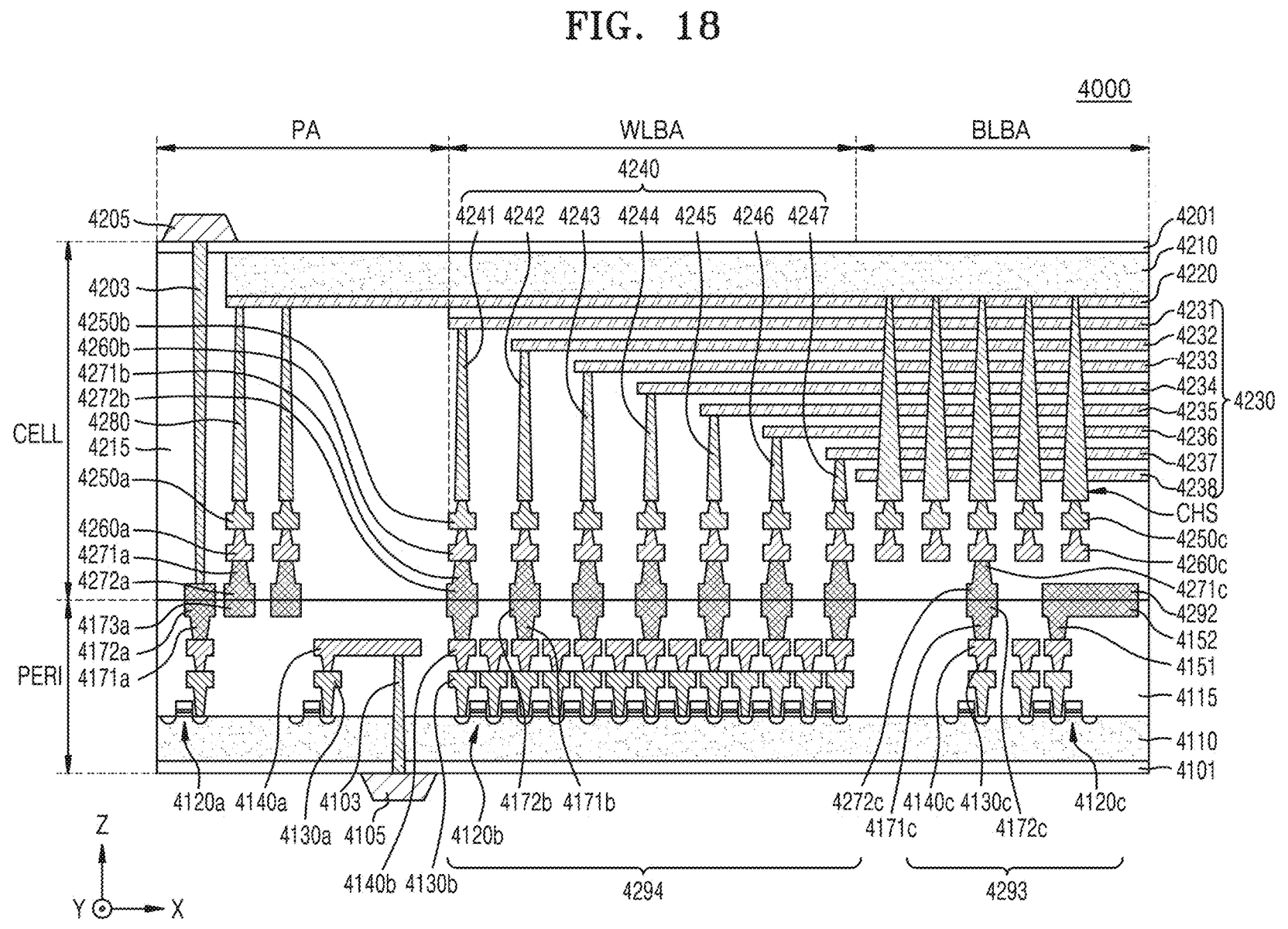

FIG. 18 is a diagram for describing a B-VNAND structure applicable to a UFS device according to some example embodiments. When a nonvolatile memory included in the UFS device is implemented as a bonding vertical NAND (B-VNAND) type flash memory, the nonvolatile memory may have a structure illustrated in FIG. 18.

Referring to FIG. 18, a memory device 4000 may have a chip-to-chip (C2C) structure. As for the C2C structure, an upper chip including a cell area CELL may be fabricated over a first wafer, a lower chip including a peripheral circuit area PERI may be fabricated over a second wafer different from the first wafer, and then the upper chip and the lower chip may be connected to each other by a bonding method. For example, the bonding method may refer to a method of electrically connecting a bonding metal formed in the uppermost metal layer of the upper chip to a bonding metal formed in the uppermost metal layer of the lower chip. For example, when the bonding metal is formed of copper (Cu), the bonding method may be a Cu—Cu bonding method, and the bonding metal may also be formed of aluminum or tungsten.

Each, or one or more, of the peripheral circuit area PERI and the cell area CELL of the memory device 4000 may include an external pad bonding area PA, a word line bonding area WLBA, and/or a bit line bonding area BLBA.

The peripheral circuit area PERI may include a first substrate 4110, an interlayer insulating layer 4115, a plurality of circuit elements 4120*a*, 4120*b*, and/or 4120*c* formed over the first substrate 4110, first metal layers 4130*a*, 4130*b*, and/or 4130*c* respectively connected to the plurality of circuit elements 4120*a*, 4120*b*, and/or 4120*c*, and/or second metal layers 4140*a*, 4140*b*, and/or 4140*c* formed over the first metal layers 4130*a*, 4130*b*, and/or 4130*c*. In some example embodiments, the first metal layers 4130*a*, 4130*b*, and/or 4130*c* may be formed of tungsten having a relatively high resistance, and the second metal layers 4140*a*, 4140*b*, and/or 4140*c* may be formed of copper having a relatively low resistance.

Herein, only the first metal layers 4130*a*, 4130*b*, and 4130*c* and the second metal layers 4140*a*, 4140*b*, and 4140*c* are illustrated and described; however, the inventive concepts are not limited thereto and at least one or more metal layers may be further formed over the second metal layers 4140*a*, 4140*b*, and/or 4140*c*. At least some of the one or more metal layers formed over the second metal layers 4140*a*, 4140*b*, and/or 4140*c* may be formed of aluminum or the like having a lower resistance than copper forming the second metal layers 4140*a*, 4140*b*, and/or 4140*c*.

The interlayer insulating layer 4115 may be arranged over the first substrate 4110 to cover the plurality of circuit elements 4120a, 4120b, and/or 4120c, the first metal layers 4130a, 4130b, and/or 4130c, and/or the second metal layers 4140a, 4140b, and/or 4140c and may include an insulating material such as silicon oxide and/or silicon nitride.

Lower bonding metals 4171b and/or 4172b may be formed over the second metal layer 4140b of the word line bonding area WLBA. In the word line bonding area WLBA, the lower bonding metals 4171b and/or 4172b of the peripheral circuit area PERI may be electrically connected to upper bonding metals 4271b and/or 4272b of the cell area CELL by a bonding method, and the lower bonding metals 4171b and/or 4172b and the upper bonding metals 4271b and/or 4272b may be formed of aluminum, copper, tungsten, or the like.

The cell area CELL may provide at least one memory block. The cell area CELL may include a second substrate 4210 and/or a common source line 4220. Over the second substrate 4210, a plurality of word lines 4230 (4231 to 4238) may be stacked in a direction (Z-axis direction) perpendicular to the upper surface of the second substrate 4210. String selection lines and/or a ground selection line may be respectively arranged over and/or under the word lines 4230, and the plurality of word lines 4230 may be arranged between the string selection lines and the ground selection line.

In the bit line bonding area BLBA, a channel structure CHS may extend in a direction perpendicular to the upper surface of the second substrate 4210 to pass through the word lines 4230, the string selection lines, and/or the ground selection line. The channel structure CHS may include a data storage layer, a channel layer, and/or a buried insulating layer, and the channel layer may be electrically connected to a first metal layer 4250c and/or a second metal layer 4260c. For example, the first metal layer 4250c may be a bit line contact, and the second metal layer 4260c may be a bit line. In some example embodiments, the bit line 4260c may extend in a first direction (Y-axis direction) parallel to the upper surface of the second substrate 4210.

In some example embodiments illustrated in FIG. 18, an area in which the channel structure CHS and the bit line 4260c are arranged may be defined as the bit line bonding area BLBA. The bit line 4260c may be electrically connected to the circuit elements 4120c providing a page buffer 4293 in the peripheral circuit area PERI in the bit line bonding area BLBA. For example, the bit line 4260c may be connected to upper bonding metals 4271c and/or 4272c in the peripheral circuit area PERI, and the upper bonding metals 4271c and/or 4272c may be connected to lower bonding metals 4171c and/or 4172c connected to the circuit elements 4120c of the page buffer 4293.

In the word line bonding area WLBA, the word lines 4230 may extend in a second direction (X-axis direction) parallel to the upper surface of the second substrate 4210 and may be connected to a plurality of cell contact plugs 4240 (4241 to 4247). The word lines 4230 and the cell contact plugs 4240 may be connected to each other at pads provided by at least some of the word lines 4230 extending in different lengths in the second direction. A first metal layer 4250b and a second metal layer 4260b may be sequentially connected to the upper portions of the cell contact plugs 4240 connected to the word lines 4230. The cell contact plugs 4240 may be connected to the peripheral circuit area PERI through the upper bonding metals 4271b and/or 4272b of the cell area CELL and/or the lower bonding metals 4171b and/or 4172b of the peripheral circuit area PERI in the word line bonding area WLBA.

The cell contact plugs 4240 may be electrically connected to the circuit elements 4120b providing a row decoder 4294 in the peripheral circuit area PERI. In some example embodiments, the operation voltage of the circuit elements 4120b providing the row decoder 4294 may be different from the operation voltage of the circuit elements 4120c providing the page buffer 4293. For example, the operation voltage of the circuit elements 4120c providing the page buffer 4293 may be greater than the operation voltage of the circuit elements 4120b providing the row decoder 4294.

A common source line contact plug 4280 may be arranged in the external pad bonding area PA. The common source line contact plug 4280 may be formed of a conductive material such as a metal, a metal compound, and/or polysilicon and may be electrically connected to the common source line 4220. A first metal layer 4250a and a second metal layer 4260a may be sequentially stacked over the common source line contact plug 4280. For example, an area in which the common source line contact plug 4280, the first metal layer 4250a, and/or the second metal layer 4260a are arranged may be defined as the external pad bonding area PA.

Moreover, input/output pads 4105 and/or 4205 may be arranged in the external pad bonding area PA. Referring to FIG. 18, a lower insulating layer 4101 covering the bottom surface of the first substrate 4110 may be formed under the first substrate 4110, and a first input/output pad 4105 may be formed over the lower insulating layer 4101. The first input/output pad 4105 may be connected through the first input/output contact plug 4103 to at least one of the plurality of circuit elements 4120a, 4120b, and/or 4120c arranged in the peripheral circuit area PERI and may be separated from the first substrate 4110 by the lower insulating layer 4101. Also, a side insulating layer may be arranged between the first input/output contact plug 4103 and the first substrate 4110 to electrically separate the first input/output contact plug 4103 from the first substrate 4110.

Referring to FIG. 18, an upper insulating layer 4201 covering the upper surface of the second substrate 4210 may be formed over the second substrate 4210, and a second input/output pad 4205 may be arranged over the upper insulating layer 4201. The second input/output pad 4205 may be connected through the second input/output contact plug 4203 to at least one of the plurality of circuit elements 4120a, 4120b, and/or 4120c arranged in the peripheral circuit area PERI.

In some example embodiments, the second substrate 4210 and the common source line 4220 may not be arranged in an area where the second input/output contact plug 4203 is arranged. Also, the second input/output pad 4205 may not overlap the word lines 4230 in a third direction (Z-axis direction). Referring to FIG. 18, the second input/output contact plug 4203 may be separated from the second substrate 4210 in a direction parallel to the upper surface of the second substrate 4210 and may be connected to the second input/output pad 4205 through an interlayer insulating layer 4215 of the cell area CELL.

In some example embodiments, the first input/output pad 4105 and the second input/output pad 4205 may be selectively formed. For example, the memory device 4000 may include only the first input/output pad 4105 arranged over the first substrate 4110 or may include only the second input/output pad 4205 arranged over the second substrate 4210. Alternatively, the memory device 4000 may include both the first input/output pad 4105 and the second input/output pad 4205.

In each, or one or more, of the external pad bonding area PA and/or the bit line bonding area BLBA respectively included in the cell area CELL and the peripheral circuit area PERI, a metal pattern of the uppermost metal layer may exist as a dummy pattern or the uppermost metal layer may be empty.

In the external pad bonding area PA of the memory device 4000, corresponding to an upper metal pattern 4272*a* formed in the uppermost metal layer of the cell area CELL, a lower metal pattern 4172*a* having the same shape as the upper metal pattern 4272*a* may be formed in the uppermost metal layer of the peripheral circuit area PERI. A lower metal pattern 4173*a* formed in the uppermost metal layer of the peripheral circuit area PERI may not be connected to a separate contact in the peripheral circuit area PERI. Similarly, in the external pad bonding area PA, corresponding to a lower metal pattern 4171*a* formed in the upper metal layer of the peripheral circuit area PERI, an upper metal pattern 4271*a* having the same shape as the lower metal pattern 4171*a* of the peripheral circuit area PERI may be formed in the upper metal layer of the cell area CELL.

The lower bonding metals 4171*b* and/or 4172*b* may be formed over the second metal layer 4140*b* of the word line bonding area WLBA. In the word line bonding area WLBA, the lower bonding metals 4171*b* and/or 4172*b* of the peripheral circuit area PERI may be electrically connected to the upper bonding metals 4271*b* and/or 4272*b* of the cell area CELL by a bonding method.

Also, in the bit line bonding area BLBA, corresponding to a lower metal pattern 4152 formed in the uppermost metal layer of the peripheral circuit area PERI, an upper metal pattern 4292 having the same shape as the lower metal pattern 4152 of the peripheral circuit area PERI may be formed in the uppermost metal layer of the cell area CELL. A contact may not be formed over the upper metal pattern 4292 formed in the uppermost metal layer of the cell area CELL.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to some example embodiments thereof, it will be understood that various changes in form and details may be made therein without departing from the spirit and scope of the following claims.

What is claimed is:

1. An operating method of a storage device including a nonvolatile memory device and a storage controller configured to communicate with a host and control the nonvolatile memory device, the operating method comprising:

storing, by the storage controller, a public key received from a first host;

transmitting, by the storage controller, a random number to a second host in response to a host authentication start request from the second host that has obtained the public key and a private key corresponding to the public key;

receiving, by the storage controller, a signature generated based on the private key and the random number from the second host;

verifying, by the storage controller, the signature based on the public key; and changing, by the storage controller, a first device parameter according to a request from the second host in response to the signature being verified, the changing the first device parameter including changing a one-time writable set value among at least three set values for setting an operation of the storage device according to the request from the second host.

2. The operating method of claim 1, wherein the one-time writable set value is stored in a first area of the nonvolatile memory device.

3. The operating method of claim 2, wherein the changing of the first device parameter further comprises changing a state of the first area from a locked state to an unlocked state.

4. The operating method of claim 1, wherein the nonvolatile memory device includes a replay protection memory block (RPMB), and the changing of the first device parameter comprises initializing an authentication key used for authentication for access to the RPMB.

5. The operating method of claim 1, wherein the changing of the first device parameter comprises initializing one or more keys including the public key stored in the storage device.

6. The operating method of claim 5, wherein the changing of the first device parameter further comprises changing a state of the storage device from a locked state to an initial state.

7. The operating method of claim 1, wherein the storing of the public key comprises:

receiving a first security command for requesting public key setting from the first host; and receiving first data including the public key from the first host.

8. The operating method of claim 1, wherein the transmitting of the random number to the host comprises:

receiving a second security command for requesting a host authentication start from the second host;

generating the random number; and transmitting second data including the random number to the second host in response to the second security command.

9. The operating method of claim 1, wherein the receiving of the signature comprises:

receiving a third security command for requesting authentication based on the signature; and receiving third data including the signature and a hash algorithm.

10. The operating method of claim 1, wherein the receiving of the signature comprises:

receiving a fourth security command for requesting key resetting; and receiving third data including the signature and a hash algorithm.

11. The operating method of claim 10, wherein the changing of the first device parameter comprises initializing a plurality of keys stored in the storage device including the public key in response to the fourth security command.

12. The operating method of claim 10, wherein the verifying of the signature comprises:

generating a first hash value by decrypting the signature based on the private key;

generating a second hash value by processing the random number based on the hash algorithm; and verifying the signature based on the first hash value and the second hash value.

13. The operating method of claim 1, wherein the first host and the second host are a same host.

14. The operating method of claim 1, wherein the storage device includes a universal flash storage (UFS) device interconnected with the host through a UFS standard.

15. An operating method of a storage device configured to communicate with a host, the operating method comprising:

receiving, by a storage controller included in the storage device, a public key from the host;

storing, by the storage controller, the public key in a key storage area of the storage device;

transmitting, by the storage controller, a random number to the host in response to a host authentication request from the host;

receiving, by the storage controller, a signature generated based on the random number and a private key corresponding to the public key from the host;

verifying, by the storage controller, the signature based on the public key; and changing, by the storage controller, a first device parameter in response to the signature being verified, wherein the storage device includes a replay protection memory block (RPMB), and the changing of the first device parameter includes setting an authentication key used for authentication for access to the RPMB to an initial state the authentication key having been changed from the initial state.

16. The operating method of claim 15, wherein the changing of the first device parameter comprises:

changing a state of the storage device from a locked state to an unlocked state; and changing a one-time writable set value among set values for setting an operation of the storage device.

17. The operating method of claim 15, wherein the changing of the first device parameter comprises initializing all keys stored in the storage device including the public key.

18. An operating method of a storage system including a host and a storage device, the operating method comprising:

obtaining, by the host, a public key corresponding to the storage device and a private key corresponding to the public key;

transmitting, by the host, the public key to the storage device;

storing, by the storage device, the public key;

transmitting, by the storage device, a random number to the host in response to a host authentication start request received from the host;

generating, by the host, a signature based on the private key and the random number;

transmitting, by the host, the signature to the storage device;

verifying, by the storage device, the signature based on the public key; and changing, by the storage device, a first device parameter according to a request from the host in response to the signature being verified, the changing the first device parameter including changing a one-time writable set value among at least three set values for setting an operation of the storage device according to the request from the host.

* * * * *